US007053167B2

(12) United States Patent
Ito et al.

(10) Patent No.: US 7,053,167 B2
(45) Date of Patent: May 30, 2006

(54) SILSESQUIOXANE DERIVATIVE HAVING FUNCTIONAL GROUP

(75) Inventors: Kenya Ito, Yokohama (JP); Mikio Yamahiro, Yokohama (JP); Kenichi Watanabe, Yokohama (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 10/661,536

(22) Filed: Sep. 15, 2003

(65) Prior Publication Data

US 2004/0068074 A1 Apr. 8, 2004

(30) Foreign Application Priority Data

Sep. 13, 2002 (JP) ............................. 2002-268716
Apr. 28, 2003 (JP) ............................. 2003-123678

(51) Int. Cl.
*C08G 77/24* (2006.01)
(52) U.S. Cl. .......................................... 528/31; 528/42
(58) Field of Classification Search ................ 528/31, 528/42, 32, 34, 37, 43; 556/451, 454, 455
See application file for complete search history.

(56) References Cited

U.S. PATENT DOCUMENTS 5,589,562 A * 12/1996 Lichtenhan et al. ........... 528/9
2003/0055193 A1* 3/2003 Lichtenhan et al.
2004/0068075 A1* 4/2004 Lichtenhan et al.

FOREIGN PATENT DOCUMENTS

EP 0 616 001 5/1997

OTHER PUBLICATIONS

Abstract of JP57012057 published Jan. 21, 1982.
Abstract of JP59213728 published Dec. 3, 1984.
Abstract of JP10087834 published Apr. 7, 1998.
Abstract of JP60086017 published May 15, 1985.
Ronald H. Baney et al., "Silsesquioxanes", Chem. Rev. 95, 1409-1430, 1995.
Cecil L. Frye et al., "The Oligomeric Silsesquioxanes", Journal of the American Chemical Society, 92, 5586-5588, Sep. 23, 1970.
Alan R. Bassindale et al., "Siloxane Hydrocarbon Octopus Molecules with Silsesquioxane Cores", J. Mater. Chem., 3 (12), 1319-1325, 1993.
Poss Chemical Catalog, "Hybrid Plastics", pp. A-1 to U-2, 2000.

* cited by examiner

*Primary Examiner*—Margaret G. Moore
(74) *Attorney, Agent, or Firm*—Wenderoth, Lind & Ponack, L.L.P.

(57) ABSTRACT

A conventional silsesquioxane derivative has the problems that the functional groups are restricted and the chemical structure is not readily controlled and that it is expensive. The present inventors have developed a process for producing a silsesquioxane derivative at a high yield by a simple process in order to solve such problems. The novel silsesquioxane derivative according to the present invention is controlled in a structure thereof and has a functional group, which is excellent in reactivity with a target compound, to be modified. The present invention relates to a production process for a silsesquioxane derivative represented by Formula (2), characterized by using a silicon compound represented by Formula (1). In Formula (1) and Formula (2), R is a group selected from hydrogen, alkyl, aryl and arylalkyl; M is a monovalent alkaline metal atom; at least one of Y is a group represented by Formula (3), and the remainder of Y is hydrogen; $R^1$ and $R^2$ in Formula (3) represent the same group as defined for R; and Z is a functional group or a group having a functional group

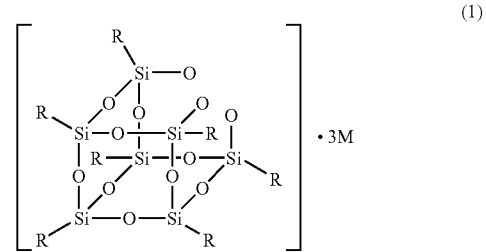

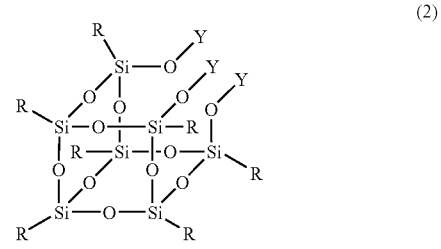

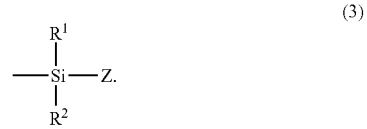

6 Claims, No Drawings

SILSESQUIOXANE DERIVATIVE HAVING FUNCTIONAL GROUP

FIELD OF THE INVENTION

The present invention relates to a process for producing a silsesquioxane derivative and a silsesquioxane derivative produced by this production process. This silsesquioxane derivative is useful as a modifying agent and an additive for providing common organic polymers with an added value such as thermal resistance, electric insulating property, water repellency, weather resistance and anti-flammability. "Silsesquioxane" is a generic name showing a compound in which each silicon atom is bonded to three oxygen atoms and each oxygen atom is bonded to two silicon atoms. In the present invention, this term is used as a general term of a silsesquioxane structure and a silsesquioxane-analogous structure in which a part thereof is deformed.

BACKGROUND OF THE INVENTION

A silsesquioxane derivative has excellent characteristics in terms of thermal resistance, electric insulating property, water repellency, weather resistance and anti-flammability. And therefore it is paid attention as a modifying agent for common organic polymers and an additive for coating materials and has so far widely been investigated. It has been reported that this silsesquioxane derivative is obtained by hydrolyzing an organic silicon compound having three hydrolyzable groups and then subjecting it to dehydration and condensation. According to, for example, a general remark described in Literature 6 written by Baney et al., it is confirmed that the existences of silsesquioxane derivatives having a ladder structure, a cage structure, a partial cage structure and a random structure.

A commercial product of silsesquioxane derivative having a random structure is present, and this is widely used in general. However, these substituents are usually methyl or phenyl and do not have reactive groups, and therefore they can not be incorporated into a part to be modified by reaction. They can be incorporated only by blending and therefore are bled out depending on the use conditions, and this means that the characteristics provided by adding a silsesquioxane derivative are lost.

A process for introducing methacryloyloxy group into one of substituents to apply it to a resist material has been disclosed in Literature 1 and Literature 2. A process for producing a silsesquioxane derivative having an alcoholic hydroxyl group has been disclosed in Literature 3. At the process, the alcoholic hydroxyl group is derived by reaction of epoxy group and water in the process which a trialkoxysilane having epoxy group is hydrolyzed and polycondensed. However, these processes have involved the problems that the compounds, which can be used among silicon compounds having a reactive functional group, are restricted and that a functional group, which may be hydrolyzed, can not be introduced as described in Literature 3.

On the other hand, a process in which a silsesquioxane derivative having a hydrosilyl group is used as a raw material and this is subjected to hydrosilylation with a compound having a functional group and an unsaturated hydrocarbon group, is known as a process for producing a silsesquioxane derivative having a functional group. Literature 4, Literature 5 and Literature 7 are examples in which the silsesquioxane derivative having a hydrosilyl group is described. Some of the silsesquioxane derivatives having a hydrosilyl group disclosed in these literatures, require a specific apparatus for using fuming sulfuric acid in producing them. Further, even if a silsesquioxane derivative having a functional group can be produced, it is not easy to control a structure thereof as desired.

Disclosed by Aguskar et al. in Literature 8 was a process in which a cage type silsesquioxane derivative is produced by carrying out reaction in the presence of iron chloride using methanol as a solvent. In this production process, however, the production can be carried out only on a very dilute condition, and the volume efficiency is low. In addition thereto, the yield is low as well, and therefore there has been the problem that the product is very expensive. In recent years, commercially available is a compound which is a silsesquioxane derivative having a partially collapsed cage type structure, a reactive substituent and a non-reactive substituent which is cyclohexyl, cyclopentyl or isobutyl (Literature 9).

Lichtenhan et al. have obtained a silsesquioxane derivative having a reactive functional group by a reaction of a silsesquioxane derivative having a partial cage structure and alkoxysilane in the presence of a hydroxide of alkaline metal or ammonium hydroxide as a catalyst (Literature 10). However, alkoxysilane is usually produced from chlorosilane, and therefore it is apparent that the cost is high as compared with that of a production process in which chlorosilane is directly reacted.

Literature 1: Japanese Patent Application Laid Open No. 12057/1982
Literature 2: Japanese Patent Application Laid Open No. 213728/1984
Literature 3: Japanese Patent Application Laid Open No. 87834/1998
Literature 4: Japanese Patent Application Laid Open No. 86017/1985
Literature 5: Japanese Patent Application Laid Open No. 340812/1994
Literature 6: Chem. Rev. 95, 1409 (1995)
Literature 7: J. Am. Chem. Soc., 92, 5586–5588 (1970)
Literature 8: J. Matter. Chem., 3 (12), 1319–1325 (1993)
Literature 9: POSS CHEMICAL CATALOG, Hybrid Plastics
Literature 10: U.S. 2003/0055193 A1 (Mar. 20, 2003)

SUMMARY OF THE INVENTION

First, terms used in the present invention shall be explained. Alkyl and alkylene in the present invention may be linear groups or branched groups in any cases. This shall apply to either a case where optional hydrogen is replaced by halogen or a cyclic group in these groups or a case where optional —$CH_2$— is replaced by —O—, —CH=CH—, cycloalkylene or cycloalkenylene. The term "optional" shows that not only the position but also the number is optional. When plural hydrogens or methylenes are replaced, they may be replaced by different groups respectively. For example, when it is expressed that optional hydrogen is replaced by —O— or —CH=CH— in alkyl, alkoxyalkenyl and alkenyloxyalkyl are included as well in the alkyl. Any group of alkoxy, alkenylene, alkenyl and alkylene in these groups may be either a linear group or a branched group. In the present invention, however, it is not preferred that adjacent plural methylenes are replaced by —O— when it is described that optional —$CH_2$— is replaced by —O—.

The present inventors have developed a process for producing a silsesquioxane derivative at a high yield by a simple process in order to solve the conventional problems described above on a silsesquioxane derivative. The novel silsesquioxane derivative according to the present invention is controlled in a structure thereof and has a functional group having an excellent reactivity with a target compound to be modified.

That is, the present invention comprises the following structures.

{1} A production process for a silsesquioxane derivative represented by Formula (2), characterized by using a silicon compound represented by Formula (1):

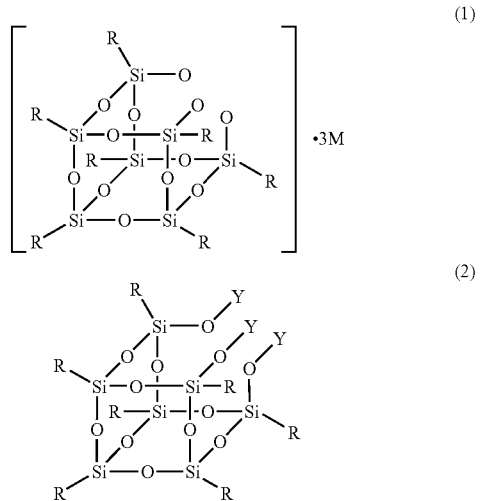

wherein in Formula (1), each R is a group selected independently from hydrogen, the group of alkyls in which the number of carbon atoms is 1 to 45, optional hydrogen may be replaced by fluorine, and optional —CH$_2$— may be replaced by —O—, —CH=CH—, cycloalkylene or cycloalkenylene, the group of substituted or non-substituted aryls, and the group of substituted or non-substituted arylalkyls in which in the alkylene group thereof, optional hydrogen may be replaced by fluorine, and optional —CH$_2$— may be replaced by —O—, —CH=CH— or cycloalkylene; and M is a monovalent alkaline metal atom; in Formula (2), R has the same meaning as that of R in Formula (1); each Y is a group selected independently from groups represented by Formula (3) and hydrogen; and at least one of Y is a group selected from the groups represented by Formula (3):

in Formula (3), R$^1$ and R$^2$ represent independently the group defined in the same manner as R in Formula (1); Z is a functional group or a group having a functional group; provided that Z is not any of a group having a dithiocarbamate group, a group having haloalkylphenyl and a group having an α-haloester group.

{2} The production process as described in the item {1}, wherein each R in Formula (1) is a group selected independently from hydrogen, the group of alkyls in which the number of carbon atoms is 1 to 20, optional hydrogen may be replaced by fluorine and optional —CH$_2$— may be replaced by —O— or cycloalkylene, the group of alkenyls in which the number of carbon atoms is 2 to 20, optional hydrogen may be replaced by fluorine and optional —CH$_2$— may be replaced by —O— or cycloalkylene, the group of alkyls in which the number of carbon atoms is 1 to 10 and at least one —CH$_2$— is replaced by cycloalkenylene, the group of phenyls in which optional hydrogen on the benzene ring may be replaced by halogen or alkyl having 1 to 10 carbon atoms, the group of phenylalkyls in which optional hydrogen on the benzene ring may be replaced by halogen or alkyl having 1 to 10 carbon atoms, and naphthyl; in the alkyl having 1 to 10 carbon atoms which is a substituent on the benzene ring, optional hydrogen may be replaced by fluorine, and optional —CH$_2$— may be replaced by —O—, —CH=CH—, cycloalkylene or phenylene; and in alkylene of the phenylalkyl, the number of carbon atoms is 1 to 12 optional hydrogen may be replaced by fluorine, and optional —CH$_2$— may be replaced by —O—, —CH=CH— or cycloalkylene.

{3} The production process as described in the item {1}, wherein each R in Formula (1) is a group selected independently from the group of alkyls in which the number of carbon atoms is 1 to 10, optional hydrogen may be replaced by fluorine and optional —CH$_2$— may be replaced by —O— or cycloalkylene, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{4} The production process as described in the item {1}, wherein all of R in Formula (1) are the same group selected from the group of alkyls in which the number of carbon atoms is 1 to 10, optional hydrogen may be replaced by fluorine and optional —CH$_2$— may be replaced by —O— or cycloalkylene, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{5} The production process as described in any one of the items {1} to {4}, wherein M in Formula (1) as described in the item {1} is Na.

{6} The production process as described in any one of the items 1 to 4, wherein M in Formula (1) as described in the item {1} is Na; in Formula (3) as described in the item {1}, R$^1$ and R$^2$ represent independently methyl, isopropyl, tert-butyl or phenyl; and Z is a functional group selected from the group consisting of hydrogen (bonded to Si atom), fluorine, chlorine, bromine, —OH, fluorinated alkyl, alkoxy, —COOH, —COO—, —OCO—, 2-oxapropanedioyl, polyalkyleneoxy, epoxy group, an oxetane ring, —NH—, —NH$_2$, —CN, —NCO, alkenyl, cycloalkenyl, —SH and —PH$_2$, or a group having the functional group, provided that Z is not any of a group having a dithiocarbamate group, a group having haloalkylphenyl and a group having an α-haloester group.

{7} A silsesquioxane derivative represented by Formula (2):

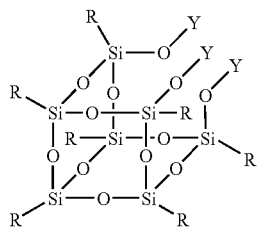

(2)

wherein each R is a group selected independently from the group of alkyls in which the number of carbon atoms is 1 to 20, at least one hydrogen is replaced by fluorine and optional —CH$_2$— may be replaced by —O—, the group of phenyls in which optional hydrogen on the benzene ring may be replaced by halogen or alkyl having 1 to 10 carbon atoms, the group of phenylalkyls in which optional hydrogen on the benzene ring may be replaced by halogen or alkyl having 1 to 10 carbon atoms and in the alkylene group thereof, optional hydrogen may be replaced by fluorine and optional —CH$_2$— may be replaced by —O—, —CH=CH— or cycloalkylene, and naphthyl; in the alkyl having 1 to 10 carbon atoms which is a substituent on the benzene ring, optional hydrogen may be replaced by fluorine, and optional —CH$_2$— may be replaced by —O—, —CH=CH—, cycloalkylene or phenylene; each Y is a group selected independently from groups represented by Formula (3) and hydrogen; and at least one of Y is a group selected from the groups represented by Formula (3):

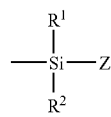

(3)

wherein R$^1$ and R$^2$ represent independently the group defined in the same manner as R in Formula (2); Z is a functional group selected from the group consisting of hydrogen (bonded to Si atom), fluorine, chlorine, bromine, —OH, fluorinated alkyl, alkoxy, —COOH, —COO—, —OCO—, 2-oxapropanedioyl, polyalkyleneoxy, epoxy group, an oxetane ring, —NH—, —NH$_2$ —CN, —NCO, alkenyl, cycloalkenyl, —SH and —PH$_2$, or a group having the functional group; provided that Z is not any of a group having a dithiocarbamate group, a group having haloalkylphenyl and a group having an α-haloester group.

{8} The silsesquioxane derivative as described in the item {7}, wherein each R in Formula (2) is a group selected independently from the group of alkyls in which the number of carbon atoms is 1 to 10, at least one hydrogen is replaced by fluorine and one —CH$_2$— may be replaced by —O—, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy and in the alkylene group thereof, the number of carbon atoms is 1 to 8 and optional —CH$_2$— may be replaced by —O—, —CH=CH— or cycloalkylene, and naphthyl.

{9} The silsesquioxane derivative as described in the item {7}, wherein all of R are the same group selected from the group of alkyls in which the number of carbon atoms is 1 to 10, at least one hydrogen is replaced by fluorine and one —CH$_2$— may be replaced by —O—, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy and in the alkylene group thereof, the number of carbon atoms is 1 to 8 and optional —CH$_2$— may be replaced by —O—, —CH=CH— or cycloalkylene, and naphthyl.

{10} The silsesquioxane derivative as described in the item {7}, wherein all of R in Formula (2) are phenyl, and R$^1$ and R$^2$ in Formula (3) represent independently methyl, isopropyl, tert-butyl or phenyl.

{11} The silsesquioxane derivative as described in the item {7}, wherein all of R in Formula (2) are alkyl in which the number of carbon atoms is 1 to 10, at least one hydrogen is replaced by fluorine and one —CH$_2$— may be replaced by —O—, and R$^1$ and R$^2$ in Formula (3) represent independently methyl, isopropyl, tert-butyl or phenyl.

{12} The silsesquioxane derivative as described in the item {7}, wherein all of R in Formula (2) are 3,3,3-trifluoropropyl, and R$^1$ and R$^2$ in Formula (3) represent independently methyl, isopropyl, tert-butyl or phenyl.

{13} The silsesquioxane derivative as described in the item {7}, wherein all of R in Formula (2) are tridecafluoro-1,1,2,2-tetrahydrooctyl, and R$^1$ and R$^2$ in Formula (3) represent independently methyl, isopropyl, tert-butyl or phenyl.

{14} The silsesquioxane derivative as described in any one of the items {7} to {13}, wherein Z in Formula (3) as described in the item {7} is hydrogen, chlorine, —OH, alkenyl, fluorinated alkyl, or a group having any of fluorine, chlorine, bromine, —OH, alkenyl, fluorinated alkyl, —COOH, 2-oxapropanedioyl, polyalkyleneoxy, acryloyloxy, methacryloyloxy, oxiranyl, 3,4-epoxycyclohexyl, oxetanyl, oxetanylene, —NH$_2$, —CN and —SH;

provided that Z is not any of a group having a dithiocarbamate group, a group having haloalkylphenyl and a group having an α-haloester group.

{15} A compound represented by Formula (1-2):

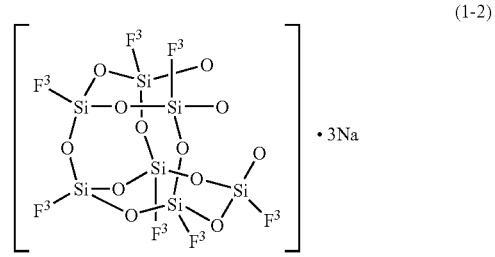

(1-2)

wherein F$^3$ is —CH$_2$CH$_2$CF$_3$.

{16} A compound represented by Formula (18):

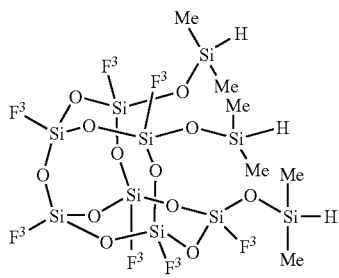

(18)

wherein $F^3$ is —$CH_2CH_2CF_3$, and Me is methyl.

{17} A compound represented by Formula (19):

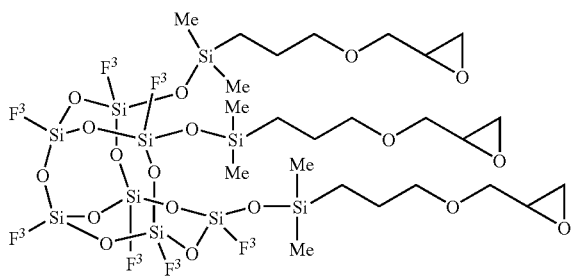

(19)

wherein $F^3$ is —$CH_2CH_2CF_3$, and Me is methyl.

{18} A compound represented by Formula (20):

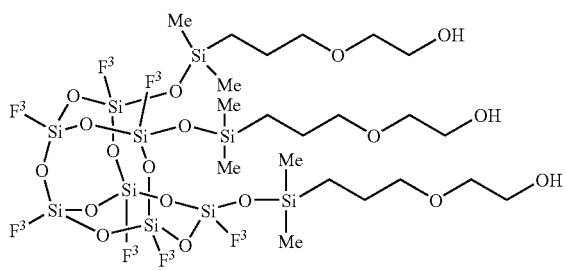

(20)

wherein $F^3$ is —$CH_2CH_2CF_3$, and Me is methyl.

{19} A compound represented by Formula (1-5):

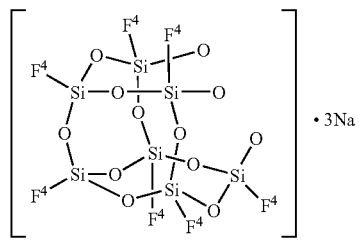

(1-5)

wherein $F^4$ is —$CH_2CH_2(CF_2)_5CF_3$.

DETAILED DESCRIPTION OF THE INVENTION

The silicon compound represented by Formula (1) shall be mentioned as the compound (1) in the following explanation. The silicon compound represented by Formula (2) shall be mentioned as the compound (2). The compounds represented by the other formulas shall be mentioned by the same abbreviated expression.

The production process of the present invention for the compound (2) is characterized by using the compound (1):

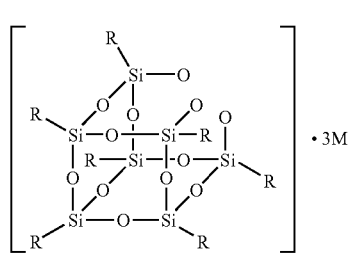

(1)

The compound (1) can readily be produced at a good yield by hydrolyzing a silicon compound having three hydrolysable groups in an oxygen-containing organic solvent in the presence of an alkaline metal hydroxide and subjecting it to polycondensation. Commercially available compounds can be used for the silicon compound having three hydrolysable groups. If it is not commercially available, it can be synthesized by publicly known techniques such as reacting halogenated silane with a Grignard reagent. Success in synthesizing this compound (1) has made it possible to complete the production process of the present invention.

In Formula (1), M is a monovalent alkaline metal atom such as lithium, potassium, sodium and cesium. The preferred example of M is sodium. Each R is a group selected independently from hydrogen, the group of alkyls having 1 to 45 carbon atoms, the group of substituted or non-substituted aryls and the group of substituted or non-substituted arylalkyls. All of R are preferably the same one group but may be constituted from two or more different groups. An example in which each R is constituted from a different group includes an example in which they are constituted from two or more alkyls, an example in which they are constituted from two or more aryls, an example in which they are constituted from two or more aralkyls, an example in which they are constituted from hydrogen and at least one aryl, an example in which they are constituted from at least one alkyl and at least one aryl, an example in which they are constituted from at least one alkyl and at least one aralkyl and an example in which they are constituted from at least one aryl and at least one aralkyl. They may be combinations other than these examples. The compound (1) having at least two different R can be obtained by using two or more raw materials in producing it. The raw materials shall be described later.

When R is alkyl, it has 1 to 45 carbon atoms, preferably 1 to about 20 carbon atoms. Optional —$CH_2$— in this alkyl may be replaced by —O—, —CH=CH—, cycloalkylene or cycloalkenylene. The preferred examples, in which R is alkyl or its related group described above, are alkyl in which the number of carbon atoms is 1 to 20, optional hydrogen may be replaced by fluorine and optional —$CH_2$— may be replaced by —O— or cycloalkylene, alkenyl in which the number of carbon atoms is 2 to 20, optional hydrogen may be replaced by fluorine and optional —$CH_2$— may be replaced by —O— or cycloalkylene, and alkyl in which the number of carbon atoms is 1 to 10 and at least one —$CH_2$— is replaced by cycloalkenylene.

The examples of such groups are alkyl having 1 to 20 carbon atoms, alkoxyalkyl having 2 to 20 carbon atoms, alkyl in which the number of carbon atoms is 1 to 10 and at least one —$CH_2$— is replaced by cycloalkylene, alkenyl having 2 to 20 carbon atoms, alkenyloxyalkyl having 2 to 20 carbon atoms, alkoxyalkenyl having 2 to 20 carbon atoms, alkyl in which the number of carbon atoms is 1 to 10 and at least one —$CH_2$— is replaced by cycloalkenylene, and groups obtained by substituting optional hydrogens with fluorine in the groups given above. In the cycloalkylene and the cycloalkenylene, they have preferably 3 to 8 carbon atoms, and two carbons, which are not adjacent to each other, may be cross-linked.

The examples of the alkyl having 1 to 20 carbon atoms are methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl, eicocyl and docoyl.

The examples of the alkoxyalkyl having 2 to 20 carbon atoms are methyloxypropyl, ethyloxypropyl, propyloxypropyl, methyloxybutyl, ethyloxybutyl, propyloxybutyl, methyloxyisobutyl, ethyloxyisobutyl and propyloxyisobutyl.

The examples of the alkyl in which the number of carbon atoms is 1 to 10 and one —$CH_2$— is replaced by cycloalkylene, are cyclohexylmethyl, adamantaneethyl, cyclopentyl, cyclohexyl, 2-bicycloheptyl and cyclooctyl. Cyclohexyl is an example in which —$CH_2$— in methyl is replaced by cyclohexylene. Cyclohexylmethyl is an example in which the 2nd —$CH_2$— in ethyl is replaced by cyclohexylene.

The examples of the alkenyl having 2 to 20 carbon atoms, are vinyl, 2-propenyl, 3-butenyl, 5-hexenyl, 7-octenyl, 10-undecenyl and 21-dococenyl. The example of the alkenyloxyalkyl having 2 to 20 carbon atoms is allyloxyundecyl.

The examples of the alkyl in which the number of carbon atoms is 1 to 10 and one —$CH_2$— is replaced by cycloalkenylene, are 2-(3-cyclohexenyl)ethyl, 5-(bicycloheptenyl)ethyl, 2-cyclopentenyl, 3-cyclohexenyl, 5-norbornene-2-yl and 4-cyclooctenyl.

More preferred example in which R is alkyl or its related group described above, is alkyl in which the number of carbon atoms is 1 to 10, at least one hydrogen is replaced by fluorine and one —$CH_2$— may be replaced by —O—. In this case, it is not preferred that —$CH_2$— bonded to Si is replaced by —O—. It is not preferred as well that —$CH_2$— at a terminal is replaced by —O—.

The examples of such preferable alkyl are trifluoromethyl, 2-fluoroethyl, 2,2-difluoroethyl, 3,3,3-trifluoropropyl, hexafluoropropyl, tridecafluoro-1,1,2,2-tetrahydrooctyl, 3,3,4,4,5,5,6,6,6-nonafluorohexyl, heptadecafluoro-1,1,2,2-tetrahydrodecyl, 2-fluoroethyloxypropyl, 2,2,2-trifluoroethyloxypropyl, 2-fluoro-1-fluoromethylethyloxypropyl, 2,2,3,3-tetrafluoropropyloxypropyl, 2,2,3,3,3-pentafluoropropyloxypropyl, hexafluoroisopropyloxypropyl, hexafluorobutyloxypropyl, heptafluorobutyloxypropyl, octafluoroisobutyloxypropyl, octafluoropentyloxypropyl, 2-fluoroethyloxybutyl, 2,2,2-trifluoroethyloxybutyl, 2-fluoro-1-fluoromethylethyloxybutyl, 2,2,3,3-tetrafluoropropyloxybutyl, 2,2,3,3,3-pentafluoropropyloxybutyl, hexafluoroisopropyloxybutyl, hexafluorobutyloxybutyl, heptafluorobutyloxybutyl, octafluoroisobutyloxybutyl, octafluoropentyloxybutyl, 2-fluoroethyloxyisobutyl, 2,2,2-trifluoroethyloxyisobutyl, 2-fluoro-1-fluoromethylethyloxyisobutyl, 2,2,3,3-tetrafluoropropyloxyisobutyl, 2,2,3,3,3-pentafluoropropyloxyisobutyl, hexafluoroisopropyloxyisobutyl, hexafluorobutyloxyisobutyl, heptafluorobutyloxyisobutyl, octafluoroisobutyloxyisobutyl and octafluoropentyloxyisobutyl.

The preferred examples, in which R in Formula (1) is substituted or non-substituted aryl, are phenyl in which optional hydrogen may be replaced by halogen or alkyl having 1 to 10 carbon atoms, and naphthyl. The preferred examples of halogen are fluorine, chlorine and bromine. In the alkyl having 1 to 10 carbon atoms which is a substituent for the phenyl, optional hydrogen may be replaced by fluorine, and optional —$CH_2$— may be replaced by —O—, —CH=CH— or phenylene.

That is, the preferred examples of substituted or non-substituted aryl are phenyl, naphthyl, halogenated phenyl, alkylphenyl, alkoxyphenyl, alkenylphenyl, phenyl having alkyl in which the number of carbon atoms is 1 to 10, at least one —$CH_2$— is replaced by phenylene and optional —$CH_2$— may be replaced by —O— or —CH=CH— as a substituent, and groups obtained by substituting optional hydrogens with fluorine in the groups given above. In the present invention, phenyl described simply unless otherwise defined means non-substituted phenyl. The same shall apply to naphthyl.

The examples of the halogenated phenyl are pentafluorophenyl, 4-chlorophenyl and 4-bromophenyl. The examples of the alkylphenyl are 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4-dimethylphenyl, 2,4,6-trimethylphenyl, 2,4,6-triethylphenyl, 4-(1-methylethyl)-phenyl, 4-(1,1-dimethylethyl)phenyl, 4-(2-ethylhexyl)-phenyl and 2,4,6-tris(1-methylethyl)phenyl.

The examples of the alkoxyphenyl are 4-methoxyphenyl, 4-ethoxyphenyl, 4-propoxyphenyl, 4-butoxyphenyl, 4-pentyloxyphenyl, 4-heptyloxyphenyl, 4-decyloxyphenyl, 4-octadecyloxyphenyl, 4-(1-methylethoxy)-phenyl, 4-(2-methylpropoxy)phenyl and 4-(1,1-dimethylethoxy)phenyl.

The examples of the alkenylphenyl are 4-vinylphenyl, 4-(1-methylvinyl)phenyl and 4-(3-butenyl)phenyl.

The examples of the phenyl having alkyl in which the number of carbon atoms is 1 to 10, at least one —$CH_2$— is replaced by phenylene and optional —$CH_2$— may be replaced by —O— or —CH=CH— as a substituent, are 4-(2-phenylvinyl)phenyl, 4-phenoxyphenyl, 3-phenylmethylphenyl, biphenyl and terphenyl. 4-(2-Phenylvinyl)phenyl is an example which in ethylphenyl the 2nd —$CH_2$— of ethyl is replaced by phenylene and another —$CH_2$— is replaced by —CH=CH—.

The examples of the phenyl in which at least one hydrogen on the benzene ring is replaced by halogen and another hydrogen is replaced by alkyl, alkoxy or alkenyl, are 3-chloro-4-methylphenyl, 2,5-dichloro-4-methylphenyl, 3,5-dichloro-4-methylphenyl, 2,3,5-trichloro-4-methylphenyl, 2,3,6-trichloro-4-methylphenyl, 3-bromo-4-methylphenyl, 2,5-dibromo-4-methylphenyl, 3,5-dibromo-4-methylphenyl, 2,3-difluoro-4-methylphenyl, 3-chloro-4-methoxyphenyl, 3-bromo-4-methoxyphenyl, 3,5-dibromo-4-methoxyphenyl, 2,3-difluoro-4-methoxyphenyl, 2,3-difluoro-4-ethoxyphenyl, 2,3-difluoro-4-propoxyphenyl and 4-vinyl-2,3,5,6-tetrafluorophenyl.

Next, an example in which R is substituted or non-substituted arylalkyl shall be given. In alkylene of the arylalkyl, optional hydrogen may be replaced by fluorine, and optional —CH$_2$— may be replaced by —O—, —CH═CH— or cycloalkylene. The preferred example of the arylalkyl is phenylalkyl. Alkylene in this phenylalkyl has preferably 1 to 12 carbon atoms, more preferably 1 to 8 carbon atoms. The examples of the unsubstituted phenylalkyl are phenylmethyl, 2-phenylethyl, 3-phenylpropyl, 4-phenylbutyl, 5-phenylpentyl, 6-phenylhexyl, 11-phenylundecyl, 1-phenylethyl, 2-phenylpropyl, 1-methyl-2-phenylethyl, 1-phenylpropyl, 3-phenylbutyl, 1-methyl-3-phenylpropyl, 2-phenylbutyl, 2-methyl-2-phenylpropyl and 1-phenylhexyl.

In the phenylalkyl, optional hydrogen on the benzene ring may be replaced by halogen or alkyl having 1 to 10 carbon atoms. In this alkyl having 1 to 10 carbon atoms, optional hydrogen may be replaced by fluorine, and optional —CH$_2$— may be replaced by —O—, —CH═CH—, cycloalkylene or phenylene. The examples of the phenylalkyl in which optional hydrogen on the benzene ring is replaced by fluorine, are 4-fluorophenylmethyl, 2,3,4,5,6-pentafluorophenylmethyl, 2-(2,3,4,5,6-pentafluorophenyl)ethyl, 3-(2,3,4,5,6-pentafluorophenyl)propyl, 2-(2-fluorophenyl)propyl and 2-(4-fluorophenyl)propyl.

The examples of the phenylalkyl in which optional hydrogen on the benzene ring is replaced by chlorine, are 4-chlorophenylmethyl, 2-chlorophenylmethyl, 2,6-dichlorophenylmethyl, 2,4-dichlorophenylmethyl, 2,3,6-trichlorophenylmethyl, 2,4,6-trichlorophenylmethyl, 2,4,5-trichlorophenylmethyl, 2,3,4,6-tetrachlorophenylmethyl, 2,3,4,5,6-pentachlorophenylmethyl, 2-(2-chlorophenyl)ethyl, 2-(4-chlorophenyl)ethyl, 2-(2,4,5-trichlorophenyl)ethyl, 2-(2,3,6-trichlorophenyl)ethyl, 3-(3-chlorophenyl)propyl, 3-(4-chlorophenyl)propyl, 3-(2,4,5-trichlorophenyl)propyl, 3-(2,3,6-trichlorophenyl)propyl, 4-(2-chlorophenyl)butyl, 4-(3-chlorophenyl)butyl, 4-(4-chlorophenyl)butyl, 4-(2,3,6-trichlorophenyl)butyl, 4-(2,4,5-trichlorophenyl)butyl, 1-(3-chlorophenyl)ethyl, 1-(4-chlorophenyl)ethyl, 2-(4-chlorophenyl)propyl, 2-(2-chlorophenyl)propyl and 1-(4-chlorophenyl)butyl.

The examples of phenylalkyl in which optional hydrogen on the benzene ring is replaced by bromine, are 2-bromophenylmethyl, 4-bromophenylmethyl, 2,4-dibromophenylmethyl, 2,4,6-tribromophenylmethyl, 2,3,4,5-tetrabromophenylmethyl, 2,3,4,5,6-pentabromophenylmethyl, 2-(4-bromophenyl)ethyl, 3-(4-bromophenyl)propyl, 3-(3-bromophenyl)propyl, 4-(4-bromophenyl)butyl, 1-(4-bromophenyl)ethyl, 2-(2-bromophenyl)propyl and 2-(4-bromophenyl)propyl.

The examples of the phenylalkyl in which optional hydrogen on the benzene ring is replaced by alkyl having 1 to 10 carbon atoms, are 2-methylphenylmethyl, 3-methylphenylmethyl, 4-methylphenylmethyl, 4-dodecylphenylmethyl, 3,5-dimethylphenylmethyl, 2-(4-methylphenyl)ethyl, 2-(3-methylphenyl)ethyl, 2-(2,5-dimethylphenyl)ethyl, 2-(4-ethylphenyl)ethyl, 2-(3-ethylphenyl)ethyl, 1-(4-methylphenyl)ethyl, 1-(3-methylphenyl)ethyl, 1-(2-methylphenyl)ethyl, 2-(4-methylphenyl)propyl, 2-(2-methylphenyl)propyl, 2-(4-ethylphenyl)propyl, 2-(2-ethylphenyl)propyl, 2-(2,3-dimethylphenyl)propyl, 2-(2,5-dimethylphenyl)propyl, 2(3,5-dimethylphenyl)propyl, 2-(2,4-dimethylphenyl)propyl, 2-(3,4-dimethylphenyl)propyl, 2-(2,5-dimethylphenyl)butyl, 4-(1-methylethyl)phenylmethyl, 2-(4-(1,1-dimethylethyl)phenyl)ethyl, 2-(4-(1-methylethyl)phenyl)-propyl and 2(3-(1-methylethyl)phenyl)propyl.

The examples of the phenylalkyl in which optional hydrogen on the benzene ring is replaced by alkyl having 1 to 10 carbon atoms and at least one hydrogen in this alkyl is replaced by fluorine, are 3-trifluoromethylphenylmethyl and 2-(4-trifluoromethylphenyl)ethyl, 2-(4-nonafluorobutylphenyl)-ethyl, 2-(4-tridecafluorohexylphenyl)ethyl, 2-(4-heptadecafluorooctylphenyl)ethyl, 1-(3-trifluoromethylphenyl)ethyl, 1-(4-trifluoromethylphenyl)ethyl, 1-(4-nonafluorobutylphenyl)ethyl, 1-(4-tridecafluorohexylphenyl)ethyl, 1-(4-heptadecafluorooctylphenyl)ethyl, 2-(4-nonafluorobutylphenyl)propyl, 1-methyl-1-(4-nonafluorobutylphenyl)ethyl, 2-(4-tridecafluorohexylphenyl)propyl, 1-methyl-1-(4-tridecafluorohexyl-phenyl)ethyl, 2-(4-heptadecafluorooctylphenyl)propyl and 1-methyl-1-(4-heptadecafluorooctylphenyl)ethyl.

The examples of the phenylalkyl in which optional hydrogen on the benzene ring is replaced by alkyl having 1 to 10 carbon atoms and —CH$_2$— in this alkyl is replaced by —CH═CH—, are 2-(4-vinylphenyl)ethyl, 1-(4-vinylphenyl)ethyl and 1-(2-(2-propenyl)phenyl)ethyl.

The examples of the phenylalkyl in which optional hydrogen on the benzene ring is replaced by alkyl having 1 to 10 carbon atoms and —CH$_2$— in this alkyl is replaced by —O—, are 4-methoxyphenylmethyl, 3-methoxyphenylmethyl, 4-ethoxyphenylmethyl, 2-(4-methoxyphenyl)ethyl, 3-(4-methoxyphenyl)propyl, 3-(2-methoxyphenyl)propyl, 3-(3,4-dimethoxyphenyl)propyl, 11-(4-methoxyphenyl)undecyl, 1-(4-methoxyphenyl)ethyl, (3-methoxymethylphenyl)ethyl and 3-(2-nonadecafluorodecenyloxyphenyl)propyl.

The examples of the phenylalkyl in which optional hydrogen on the benzene ring is replaced by alkyl having 1 to 10 carbon atoms and one of —CH$_2$— in this alkyl is replaced by cycloalkylene are, to give the examples thereof including those in which another —CH$_2$— is replaced by —O—, cyclopentylphenylmethyl, cyclopentyloxyphenylmethyl, cyclohexylphenylmethyl, cyclohexylphenylethyl, cyclohexylphenylpropyl and cyclohexyloxyphenylmethyl.

The examples of the phenylalkyl in which optional hydrogen on the benzene ring is replaced by alkyl having 1 to 10 carbon atoms and one of —CH$_2$— in this alkyl is replaced by phenylene are, to give the examples thereof including those in which another —CH$_2$— is replaced by —O—, 2-(4-phenoxyphenyl)ethyl, 2-(4-phenoxyphenyl)propyl, 2-(2-phenoxyphenyl)propyl, 4-biphenylylmethyl, 3-biphenylylethyl, 4-biphenylylethyl, 4-biphenylylpropyl, 2-(2-biphenylyl)propyl and 2-(4-biphenylyl)propyl.

The examples of the phenylalkyl in which at least two hydrogen on the benzene ring are replaced by diffrent groups respectively, are 3-(2,5-dimethoxy-3,4,6-trimethylphenyl)propyl, 3-chloro-2-methylphenylmethyl, 4-chloro-2-methylphenylmethyl, 5-chloro-2-methylphenylmethyl, 6-chloro-2-methylphenylmethyl, 2-chloro-4-methylphenylmethyl, 3-chloro-4-methylphenylmethyl, 2,3-dichloro-4-methylphenylmethyl, 2,5-dichloro-4-methylphenylmethyl, 3,5-dichloro-4-methylphenylmethyl, 2,3,5-trichloro-4-methylphenylmethyl, 2,3,5,6-tetrachloro-4-methylphenylmethyl, 2,3,4,6-tetrachloro-5-methylphenylmethyl, 2,3,4,5-tetrachloro-6-methylphenylmethyl, 4-chloro-3,5-dimethylphenylmethyl, 2-chloro-3,5-dimethylphenylmethyl, 2,4-dichloro-3,5-dimethylphenylmethyl, 2,6-dichloro-3,5-dimethylphenylmethyl, 2,4,6-trichloro-3,5-dimethylphenylmethyl, 3-bromo-2-methylphenylmethyl, 4-bromo-2-methylphenylmethyl, 5-bromo-2-methylphenylmethyl, 6-bromo-2-methylphenylmethyl, 3-bromo-4-methylphenylmethyl, 2,3-dibromo-4-methylphenylmethyl, 2,3,5-tribromo-4-methylphenylmethyl, 2,3,5,6-tetrabromo-4-methylphenylmethyl and 11-(3-chloro-4-methoxyphenyl)undecyl.

The most preferred examples of phenyl group in the phenylalkyl are non-substituted phenyl and phenyl having at least one of fluorine, alkyl having 1 to 4 carbon atoms, vinyl and methoxy as a substituent.

The examples of the phenylalkyl in which —CH$_2$— in alkylene is replaced by —O—, —CH=CH— or cycloalkylene, are 3-phenoxypropyl, 1-phenylvinyl, 2-phenylvinyl, 3-phenyl-2-propenyl, 4-phenyl-4-pentenyl, 13-phenyl-12-tridecenyl, phenylcyclohexyl and phenoxycyclohexyl.

The examples of the phenylalkenyl in which hydrogen on the benzene ring is replaced by fluorine or methyl, are 4-fluorophenylvinyl, 2,3-difluorophenylvinyl, 2,3,4,5,6-pentafluorophenylvinyl and 4-methylphenylvinyl.

Preferred R among the examples described above are the alkyl in which the number of carbon atoms is 1 to 10, optional hydrogen may be replaced by fluorine and optional —CH$_2$— may be replaced by —O— or cycloalkylene, the phenyl in which optional hydrogen may be replaced by halogen, methyl or methoxy, and the phenylalkyl in which optional hydrogen on the benzene ring may be replaced by fluorine, alkyl having 1 to 4 carbon atoms, vinyl or methoxy. Alkylene in this phenylalkyl has 1 to 8 carbon atoms, and optional —CH$_2$— in this alkylene may be replaced by —O—, —CH=CH— or cycloalkylene. When phenyl has plural substituents in the preferred examples of R described above, these substituents may be the same groups or different groups. All of R in Formula (1) are preferably the same group selected from these preferred examples of R.

More preffered examples of R are 3,3,3-trifluoropropyl, hexafluoropropyl, tridecafluoro-1,1,2,2-tetrahydrooctyl, 3,3,4,4,5,5,6,6,6-nonafluorohexyl, heptadecafluoro-1,1,2,2-tetrahydrodecyl, 2-fluoroethyloxypropyl, 2,2,2-trifluoroethyloxypropyl, 2-fluoro-1-fluoromethylethyloxypropyl, 2,2,3,3-tetrafluoropropyloxypropyl, 2,2,3,3,3-pentafluoroisopropyloxypropyl, hexafluoroisopropyloxypropyl, hexafluorobutyloxypropyl, heptafluorobutyloxypropyl, octafluoroisobutyloxypropyl, octafluoropentyloxypropyl, phenyl, halogenated phenyl, phenyl in which at least one hydrogen on the benzene ring is replaced by methyl, methoxyphenyl, naphthyl, phenylmethyl, phenylethyl, phenylbutyl, 2-phenylpropyl, 1-methyl-2-phenylethyl, pentafluorophenylpropyl, 4-ethylphenylethyl, 3-ethylphenylethyl, 4-(1,1-dimethylethyl) phenylethyl, 4-vinylphenylethyl, 1-(4-vinylphenyl)ethyl, 4-methoxyphenylpropyl and phenoxypropyl.

The most preffered examples of R are 3,3,3-trifluoropropyl, tridecafluoro-1,1,2,2-tetrahydrooctyl and phenyl.

As described above, the compound (2) is readily obtained by using the compound (1):

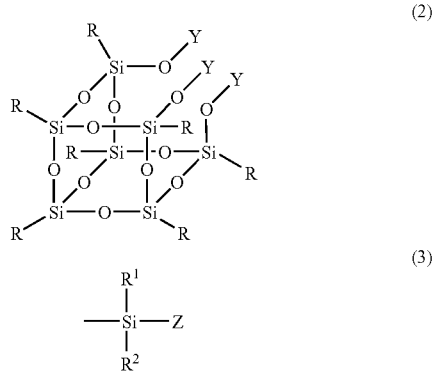

(2)

(3)

In formula (2), R has the same meaning as that of R in formula (1), and each Y is a group selected independently from the groups represented by Formula (3) and hydrogen, provided that at least one of Y is a group selected from the groups represented by Formula (3). When at least two Y are the groups represented by Formula (3), these Y may be the same group or may be constituted from at least two different groups.

In Formula (3), $R^1$ and $R^2$ represent independently the group defined in the same manner as R in Formula (2). Z represents a functional group or a group having a functional group. The preferred examples of $R^1$ or $R^2$ are alkyl having 1 to 10 carbon atoms and substituted or non-substituted phenyl. In this case, in the alkyl having 1 to 10 carbon atoms, optional hydrogen may be replaced by fluorine, and optional —CH$_2$— may be replaced by —O—. More preferred examples of $R^1$ or $R^2$ are methyl, isopropyl, tert-butyl and phenyl.

The examples of the functional group are hydrogen (bonded directly to Si atom), fluorine, chlorine, bromine, —OH, fluorinated alkyl, alkoxy, —COOH, —COO—, —OCO—, 2-oxapropanedioyl, polyalkyleneoxy, epoxy group, an oxetane ring, —NH—, —NH$_2$, —CN, —NCO, alkenyl, cycloalkenyl, —SH and —PH$_2$. Hydroxy, halogens, alkoxy, —COO—, —OCO— and alkenyl may be bonded directly to a Si atom or may be bonded to a Si atom via a divalent group. The examples of the divalent group are alkylene, alkylcycloalkylene, alkylphenylene and alkylphenylalkylene, and one of —CH$_2$— in alkyl or alkenyl in these divalent groups may be replaced by —O— or —CO—. The other groups excluding —OH, halogens, alkoxy, —COO—, —OCO— and alkenyl are preferably bonded to a Si atom via the divalent group. The examples of the alkenyl are vinyl and propenyl. The examples of the cycloalkenyl are cyclopentadienyl, cyclohexenyl and norbornenyl. The examples of the group having epoxy are a group having oxiranyl and a group having oxiranylene. The example of the group having oxiranylene is a group having a 3,4-epoxycyclohexyl group. Provided that Z is not any of a group having a dithiocarbamate group, a group having haloalkylphenyl and a group having an α-haloester group.

More preferred examples of Z are hydrogen, fluorine, chlorine, —OH, alkenyl, fluorinated alkyl and a group having any of fluorine, chlorine, bromine, —OH, alkenyl, fluorinated alkyl, —COOH, 2-oxapropanedioyl, polyalkyleneoxy, acryloyloxy, methacryloyloxy, oxiranyl, 3,4-epoxycyclohexyl, oxetanyl, oxetanylene, —NH$_2$, —CN and —SH.

The specific examples of such Z are shown below:

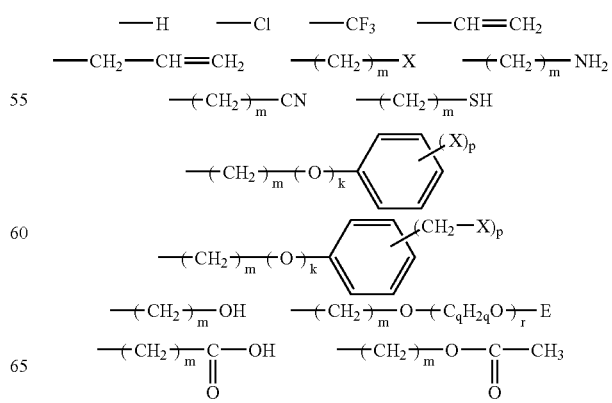

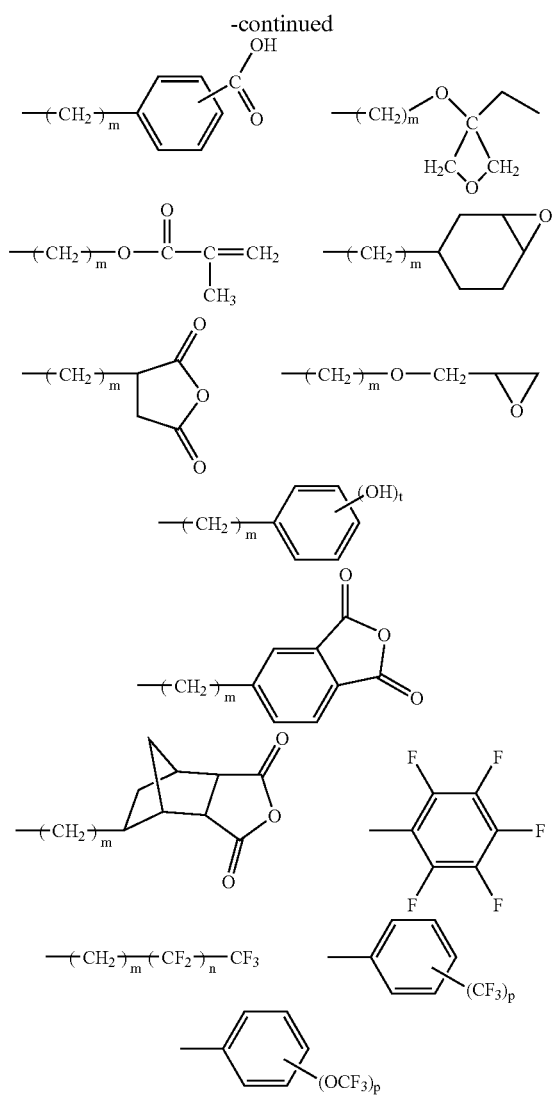

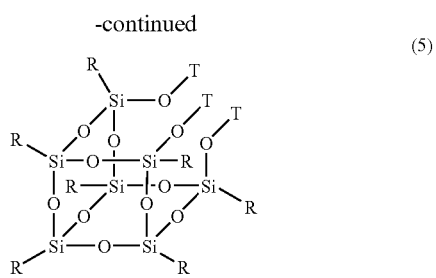

wherein $R^1$ and $R^2$ in Formula (4) are the same as these marks in Formula (3), and in Formula (5), R has the same meaning as that of R in Formula (1), and T is a group selected independently from the following group obtained by removing Cl from Formula (4) and hydrogen. Provided that at least one of T is a group selected from a group represented by the following formula:

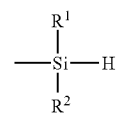

The compound (4) is chlorosilanes, but the other halogenated silanes can be used as well. The compound (4) is available as a commercial product. The compounds, which are not the commercial products, can readily be obtained by publicly known synthetic techniques, for example, reaction of halogenated silane with a Grignard reagent. Taking the availability into consideration, the preferred examples of compound (4) is dimethylchlorosilane, diethylchlorosilane, methylethylchlorosilane, methylhexylchlorosilane, diisopropylchlorosilane, di-tert-butylchlorosilane, dicyclopentylchlorosilane, dicyclohexylchlorosilane, di-normal-octyl-chlorosilane, methylphenylchlorosilane and diphenylchlorosilane. More preferred examples of the compound (4) are dimethylchlorosilane, diisopropylchlorosilane, di-tert-butylchlorosilane, methylphenylchlorosilane and diphenylchlorosilane.

In the formulas described above, m is an integer of 2 to 4; n is an integer of 0 to 15; X is halogen; p is an integer of 1 to 5; q is an integer of 2 or 3; r is an integer of 2 to 200; t is an integer of 1 to 3; and E is hydrogen or alkyl having 1 to 4 carbon atoms. In the examples described above, the bonding positions of X, OH, COOH, $CF_3$ and $OCF_3$ onto the benzene rings are optional. The preferred halogens are F and Cl. The preferred range of r is 2 to 100, and more preferred range thereof is 2 to 20.

One of processes for producing the compound (2) from the compound (1) is a process in which the compound (1) is first reacted with a compound (4) to prepare a compound (5) and the compound (5) is then subjected to hydrosilylation with a compound having a functional group and an unsaturated hydrocarbon group to thereby prepare the compound (2):

An organic solvent is preferably used for the reaction of the compound (1) with the compound (4). That is, the compound (1) is mixed with an organic solvent, and the compound (4) is dropwise added to this mixture, whereby the reaction goes on while by-producing chloride of alkaline metal. After finishing the reaction, water is added to dissolve the chloride described above and to hydrolyze the unreacted compound (4). Then, the organic layer is fractionized, and the solvent is removed by distillation, whereby the compound (5) can be obtained. The organic layer is washed with water and dried on a dehydrating agent before removing the solvent, whereby the compound having a high purity can be obtained. The compound (5) can be improved in purity, if necessary, by washing with a solvent, extracting impurities or recrystallizing.

The solvent described above used in the reaction is selected on the condition that it does not retard progress of the reaction. The preferred solvents are aliphatic hydrocarbons (examples: hexane and heptane), aromatic hydrocarbons (examples: benzene, toluene and xylene), ethers (examples: diethyl ether, tetrahydrofuran (THF) and 1,4-dioxane), halogenated hydrocarbons (examples: methylene chloride and carbon tetrachloride) and esters (examples:

ethyl acetate). These solvents may be used alone or in combination of a plurality thereof. More preferred solvents are the aromatic hydrocarbons and the ethers. The most preferred example of the aromatic hydrocarbons is toluene. The most preferred example of the ethers is THF. The compound (4) is readily reacted with water, and therefore the solvent having a very small moisture content is preferably used.

A preferred proportion of the compound (1) in mixing with the solvent is 0.05 to 200% by weight based on the weight of the solvent. The range for controlling a concentration of the by-produced salts so that it is not such high as retarding progress of the reaction is 100% by weight or less. The range for preventing the volume efficiency from being so deteriorated that an adverse effect is exerted on the cost is 0.05% by weight or more. More preferred proportion is 5 to 50% by weight. A use amount of the compound (4) shall not be restricted as long as it is used in a mole ratio of 3 or more based on the compound (1), but considering an after-treatment step, it is not preferably used in an excess amount. When a use proportion of the compound (4) to this compound (1) is smaller than a mole ratio of 3, the compound (5) in which a part of T is hydrogen is obtained. Further, when the compound (4) has a low reactivity, the compound (5) in which a part of T is hydrogen is obtained in a certain case even if the use proportion thereof is a mole ratio of 3 or more. The reaction temperature may be a room temperature, and heating may be carried out, if necessary, in order to accelerate the reaction. Cooling may be carried out, if necessary, for the purpose of preventing heat generated by the reaction to control undesirable reactions.

This reaction can readily be accelerated by adding a compound having an amino group such as triethylamine or an organic compound showing basicity. To give an example in which triethylamine is used, a preferred use amount thereof falls in a range of 0.005 to 10% by weight, more preferably 0.01 to 3% by weight based on the weight of the solvent. However, an added amount of triethylamine shall not be specifically restricted as long as the reaction can readily be accelerated. In the reaction described above using the compound (1), the reaction time is 0.5 to 8 hours. In general, however, the reaction time is influenced by a reactivity of the raw materials, a raw material concentration, a temperature, the shape (stirring efficiency) of the apparatus and the form of the product or the by-product, and therefore it is not meant that the range of the reaction time restricts the present invention.

The compound (2) can be synthesized by subjecting the compound (5) thus obtained to hydrosilylation with a compound having a functional group and an unsaturated hydrocarbon group. The examples of the unsaturated hydrocarbon group are alkenyl having 2 to 30 carbon atoms, alkynyl having 2 to 30 carbon atoms, cycloalkenyl having 3 to 8 carbon atoms, cycloalkenylalkyl having 4 to 10 carbon atoms and arylalkenyl having 8 to 10 carbon atoms, and optional —$CH_2$— in these groups may be replaced by —O— or —CO—. More specific examples thereof are vinyl, allyl, isopropenyl, 3-butenyl, 2,4-pentadienyl, butadienyl, 5-hexenyl, 10-undecenyl, ethynyl, 2-propynyl, 5-hexynyl, 2-cyclopentenyl, 3-cyclopentenyl, 2-cyclohexenyl, 3-cyclohexenyl, 3-cyclohexenylethyl, norbornenyl, 4-cyclooctenyl, cyclooctadienyl, styrylethyl, styryloxy, allyloxypropyl, vinyloxymethyl, 1-cyclopentenyloxy, 2-cyclopentenyloxy, 3-cyclopentenyloxy, 2-cyclohexenyloxy, 3-cyclohexenyloxy, acryloyl, acryloyloxy, methacryloyl and methacryloyloxy. However, the unsaturated hydrocarbon groups shall not be restricted to these examples.

The examples of compounds having epoxy group and unsaturated hydrocarbon group are allylglycidylether, 2-methylallylglycidylether, glycidylvinylether, glycidylbenzilether, glycidylmaleate, glycidylitaconate, glycidylacrylate, glycidylmethacrylate, 2,6-dimethyl-2,3-epoxy-7-octene, 1,2-epoxy-6-heptene, 1,2-epoxy-3-butene, 2-cyclohexene-1-glycidylether, cyclohexene-4,5-diglycidylcalboxylate, cyclohexene-4-glycidylcalboxylate, 5-norbornene-2-methyl-2-glycidylcalboxylate, endo-cis-bicyclo[2.2.1]-5-heptene-2,3-diglycidyldicalboxylate, 1-methyl-4-isopropenylcyclohexeneoxide, 1,4-dimethyl-4-vinylcyclohexeneoxide, 4-vinylcyclohexeneoxide, vinylnorbornene-mono-oxide and dicyclopentadiene-mono-oxide.

Taking the availability into consideration, the preferred compounds are 4-vinylcyclohexeneoxide, allyl-glycidylether and glycidylmethacrylate.

The examples of compounds having hydoxyl group and unsaturated hydrocarbon group are allylalcohol, 3-butene-1-ol, 3-butene-2-ol, ethyleneglycol-mono-vinylether, ethyleneglycol-mono-allylether, diethyleneglycol-mono-allylether, glycerinmonoallylether, trimethyloletane-mono-allylether, trimethylolpropane-mono-allylether, polyethyleneglycol-mono-allylether, polypropyleneglycol-mono-allylether, 1-vinylcyclobutanol, 2-vinylcyclobutanol, 3-vinylcyclobutanol, vinylphenol, 2-allylphenol, 4-allylphenol, 4-allyl-2-methoxyphenol, 4-allyl-2,6-dimethoxyphenol, 4-(2-propenyl)-1,2-benzenediol and 4-(2,4-dihydroxyphenyl)-3-butene-2-one.

A hydroxyl group of these compounds may be turned into carbonyl, ester, ether, acetal, ketal or silylether by combining with a protective group. Taking the availability into consideration, the preferred compounds among them are allyl alcohol, ethylene glycol monoallyl ether, glycerin monoallyl ether, trimethylolpropane monoallyl ether, 2-allylphenol and 4-allylphenol.

The examples of compounds having mercapto group and unsaturated hydrocarbon group are allylmercaptan and 2-methyl-2-propene-1-thiol.

The examples of compounds having calboxyl group and unsaturated hydrocarbon group are (meth)acrylic acid, crotonic acid, isocrotonic acid, 3-butenoic acid, 2-methyl-3-butenoic acid, 2,2-dimethyl-3-butenoic acid, 2-n-propyl-3-penteonic acid, 4-penteonic acid, 3-methyl-4-penteonic acid, 2,2-dimethyl-4-penteonic acid, 3,3-dimethyl-4-penteonic acid, 4-hexanoic acid, 5-hexanoic acid, 2,6-heptadienoic acid, 7-octenoic acid, 8-nonanoic acid, 9-decenoic acid, 10-undecenoic acid, 11-dodecenoic acid, propionic acid, 2-butynoic acid, maleic acid, fumaric acid, acetylenecarboxylic acid, 2-vinylbenzoic acid, 3-vinylbenzoic acid, 4-vinylbenzoic acid and 4-allyl-2,3,5,6-tetrafluorobenzoic acid.

(Meth)acrylic acid is a general term of acrylic acid and methacrylic acid. A carboxyl group in these compounds may be esterified by reaction with alcohols or may be protected by a trialkylsilyl group. Among them, the preferred compounds are, taking the availability into consideration, (meth)acrylic acid, vinyl acetate, 4-pentenoic acid, 10-undecenoic acid and 4-vinyl benzoate.

The examples of a compound having a 2-oxapropanedioyl group and an unsaturated hydrocarbon group are allylsuccinic anhydride, isobutenylsuccinic anhydride, bicycle[2.2.2]oct-7-ene-2,3,5,6-tetracarboxylic dianhydride and 5-norbornene-2,3-dicarboxylic anhydride. Taking the availability into consideration, the preferred compounds among them are allylsuccinic anhydride and 5-norbornene-2,3-dicarboxylic anhydride.

The examples of compounds having perfluoroalkyl and unsaturated hydrocarbon group are $C_2F_5CH=CH_2$, $n\text{-}C_4F_9CH=CH_2$, $n\text{-}C_6F_{13}CH=CH_2$, $n\text{-}C_8F_{17}CH=CH_2$, $n\text{-}C_{10}F_{21}CH=CH_2$, $n\text{-}C_{12}F_{25}CH=CH_2$, $n\text{-}C_{14}F_{29}CH=CH_2$, $n\text{-}C_6F_{13}CH_2CH_2CH=CH_2$, entafluoropropylmethacrylate, tetrafluoropropylmethacrylate, heptafluorobutylmethacrylate, octafluoropentylmethacrylate and hexadecafluorononylmethacrylate.

The examples of compounds having trifluoropropyl group and unsaturated hydrocarbon group are trifluoroethylmethacrylate, hexafluoroisopropylmethacrylate, 1,1,1-trifluoro-2-phenyl-3-butene-2-ol and β-nitro-4-(trifluoromethyl)styrene.

The examples of compounds haing cyano group and unsaturated hydrocarbon group are, acrylonitrile, allylcyanide, methacrylonitrile, crotononitrile, 3-methylcrotononitrile, ethylacrylonitrile, 2-butenenitrile, 2-methyl-3-butenenitrile, 4-methyl-3-pentenenitrile and 5-hexenenitrile. Taking the availability into consideration, the preferred compounds are acrylonitrile, allylcyanide and methacrylonitrile.

The examples of compounds having isocyanate group and unsaturated hydrocarbon group are vinyl isocyanate, allylisocyanate, 3-isocyanate-2-methyl-1-propene, methacryloylisocyanate, isocyanate ethyl methacrylate, vinylbenzilisocyanate, 3-isocyanate-1-butene, 3-isocyanate-3-methyl-1-butene, 4-isocyanate-2-methyl-1-butene, 4-isocyanate-3,3-dimethyl-1-butene, 4-isocyanate-4-methyl-1-pentene and 5-isocyanate-1-pentene. Taking the availability into consideration, the preferred compounds are vinylisocyanate, allylisocyanate and methacryloylisocyanate.

The examples of a compound having a (meth)acryloyl group and an unsaturated hydrocarbon group are allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-3-propenyl (meth)acrylate, 3-heptenyl (meth)acrylate, 4-hexenyl (meth)acrylate, and 1:1 adducts of 2-hydroxyethyl (meth)acrylate and vinylcyclohexenemonoepoxide. (Meth)acryloyl is a general term of acryloyl and methacryloyl. Such acrylic compounds can be synthesized by, for example, reaction of (meth)acrylic chloride with alkenyl alcohol, transesterification of alkyl (meth)acrylate with alkenyl alcohol and addition reaction of an isocyanate group-containing acrylic monomer with alkenyl alcohol.

Some of the compounds having alkyleneoxy group and unsaturated hydrocarbon group are commercially available form NOF Corporation (Japan). The examples of product name of polyethyleneglycolmonoallylether are PKA-5001, PKA-5002, PKA-5003, PKA-5004 and PKA-5005. The examples of product name of methoxypolyethyleneglycolallylether are PKA-5006, PKA-5007, PKA-5008, PKA-5009 and PKA-5010. The example of product name of polypropyleneglycolmonoallylether is PKA-5014. The examples of product name of polyethyleneglycol-polypropyleneglycolallylether are PKA-5011, PKA-5012 and PKA-5013.

When the commercial products are not available, allyl ether having an alkyleneoxy group can be obtained by a process which polyalkylene glycol or a monoether compound thereof is reacted with sodium hydride to prepare sodium alcoholate and then the sodium alcoholate is reacted with allyl bromide.

One compound selected from the foregoing compounds having a functional group and an unsaturated hydrocarbon group is reacted with the compound (5) to thereby obtain the compound (2) having the same functional groups. The compound (2) having two different functional groups can be synthesized by a reaction of at least two compounds, which have a functional group and an unsaturated hydrocarbon group, and the compound (5). In this case, considering a difference in the reactivity between the compounds having a functional group and an unsaturated hydrocarbon group, they are reacted at the same time in the form of a mixture or they are successively reacted one by one. When successively reacted, the reactivity of the functional groups is a hindrance in a certain case, and in such case, it is advisable to protect the functional groups in advance with a protective group such as trimethylsilyl.

A solvent used when subjecting the compound (5) to hydrosilylation with the compound having a functional group and an unsaturated hydrocarbon group is selected on the condition that it does not retard progress of the reaction. The preferred solvents are aliphatic hydrocarbons (examples: hexane and heptane), aromatic hydrocarbons (examples: benzene, toluene and xylene), ethers (examples: diethyl ether, THF and 1,4-dioxane), halogenated hydrocarbons (examples: methylene chloride and carbon tetrachloride) and esters (examples: ethyl acetate). These solvents may be used alone or in combination of a plurality thereof. Among these solvents, the aromatic hydrocarbons are more preferred, and toluene is most preferred.

When the compound (5) is reacted with the compound having a functional group and an unsaturated hydrocarbon group, the solvent is not necessarily required, and when used, a preferred proportion of the compound (5) to the solvent is 0.05 to 80% by weight based on the weight of the solvent. More preferred proportion is 30 to 70% by weight based on the weight of the solvent. A use proportion of the compound having a functional group and an unsaturated hydrocarbon group to the compound (5) is varied according to the purposes, and when reacted with all of three Si—H groups, the proportion preferred for enhancing the yield is a mole ratio of 3 or more based on the compound (5). Also when introducing different functional groups, a proportion of the total use amount thereof has to be a mole ratio of 3 or more in order to prevent Si—H group from remaining. When allowing a part of Si—H groups to remain, a use proportion of the compound having a functional group and an unsaturated hydrocarbon group to the compound (5) may be a mole ratio of smaller than 3. When the number of Si—H groups in the compound (5) is less than 3, consideration may be made in accordance with the number thereof in the same manner as described above.

The reaction temperature may be a room temperature, and heating may be carried out, if necessary, in order to accelerate the reaction. Cooling may be carried out, if necessary, for the purpose of preventing heat generated by the reaction to control undesirable reactions. The reaction can be allowed to more easily proceed by adding, if necessary, a hydrosilylation catalyst. The examples of the preferred hydrosilylation catalyst are a Karstedt's catalyst and a Spier's catalyst, and they are usually well known catalysts.

These hydrosilylation catalysts have a high reactivity, and therefore addition of a small amount thereof can sufficiently promote the reaction. Usually, they may be used in a range where transition metal contained therein accounts for $10^{-9}$ to 1 mole % based on the hydrosilyl group. The preferred addition amount is $10^{-7}$ to $10^{-3}$ mole %. The catalyst addition amount required for making it possible to promote the reaction and finishing it within admissible time is such an amount that the transition metal contained therein accounts for $10^{-9}$ mole % or more based on the hydrosilyl group. Considering to control the production cost to a lower level, the catalyst addition amount is preferably such an amount that the transition metal contained therein accounts for 1 mole % or less based on the hydrosilyl group.

Another process for producing the compound (2) using the compound (1) is a process in which the compound (1) is reacted with a compound (6):

(6)

However, when the compound (6) is used, the kind of a functional group is restricted. Z in Formula (6) is a group selected from the range of Z in Formula (3), and the range thereof is restricted rather than that of Z in Formula (3). The compound (6) can be available as well in the form of a commercial product, but even if it is not commercially available, it can be synthesized by publicly known technique such as reacting halogenated silane with a Grignard reagent. When the compound (6) can be available in the form of a commercial product, this process is advantageous. This reaction can fundamentally be carried out just in the same method as in the reaction of the compound (1) with the compound (4). A preferred use amount of the compound (6) is a mole ratio of 3 or more based on the compound (1) in order to enhance the yield in the reaction. If a kind of compound (6) is reacted with the compound (1), the compound (2) having the same functional groups is obtained. The compound (2) having two different functional groups can be synthesized by a reaction of one compound (1) and at least two compounds (6). In this case, considering a difference in reactivity between the compounds (6), they are reacted at the same time in the form of a mixture or they are successively reacted one by one. When successively reacted, the reactivity of the functional group is a hindrance in a certain case, and in such case, it is advisable to protect the functional group in advance with a protective group such as trimethylsilyl. When using at least two compounds (6), the total use amount thereof is a mole ratio of 3 or more based on the compound (1). When this mole ratio is smaller than 3 or the compound (6) has a low reactivity, the compound (2) in which a part of Y is hydrogen is obtained. The examples of the compound (6) are acetic acid 2(chlorodimethylsilanyl)-ethyl ester, acetic acid 3(chlorodimethylsilanyl)-propyl ester, 1-(chlorodimethylsilanyl)-3-trimethylsilanyl-propane, 11-(chlorodimethylsilanyl)-undecanoic acid methyl ester, chloro-chloromethyl-dimethyl-silane, chloro-chloromethyl-methyl-silane, chloro-dichloromethyl-dimethyl-silane, chloro-bis-chloromethyl-methyl-silane, bromomethyl-chloro-dimethyl-silane, chloro-(3-chloro-propyl)-dimethyl-silane, chloro-(4-chloro-butyl)-dimethyl-silane, (11-bromo-undecyl)-chloro-dimethyl-silane, chloro-[2-(4-chloromethyl-phenyl)-ethyl]-dimethyl-silane, 4-(chloro-dimethyl-silanyl)-butyronitrile, 4-(chloro-diisopropyl-silanyl)-butyronitrile, chloro-dimethyl-vinyl-silane, allyl-chloro-dimethyl-silane, chloro-hex-5-enyl-dimethyl-silane, chloro-dimethyl-oct-7-enyl-silane, chloro-dimethyl-undec-10-enyl-silane, chloro-methyl-phenyl-vinyl-silane, chloro-diphenyl-vinyl-silane, chloro-diisopropyl-phenylethynyl-silane, chloro-trivinyl-silane, chloro-(2-cyclohex-3-enyl-ethyl)-dimethyl-silane, (2-bicyclo[2.2.1]hept-5-en-2-yl-ethyl)-chloro-dimethyl -silane, chloro-(3-isocyanato-propyl)-dimethyl-silane, 2-methyl-acrylic acid 3-(chloro-dimethyl-silanyl)-propyl ester, chloro-dimethyl-(3,3,3-trifluoro-propyl)-silane, (3,5-bis-trifluoromethyl-phenyl)-chloro-dimethyl-silane, chloro-dimethyl-pentafluorophenyl-silane, chloro-dimethyl-(3-pentafluorophenyl-propyl)-silane, chloro-(3,3,4,4,5,5,6,6,7,7,8,8,9,9,10,10,10-heptadecafluoro-decyl)-dimethyl-silane, chloro-dimethyl-(3,3,4,4,5,5,6,6,7,7,8,8-tridecafluoro-octyl)-silane, and (chloro-dimethyl-silanyl)-dimethyl-amine.

The compound (2) having a polymerizable group can be turned into a polymer by an ordinary method such as a radical polymerization method, an anionic polymerization method, a cationic polymerization method, a metal-initiated polymerization method, an addition polymerization method and a polycondensation polymerization method. In this case, the compound (2) may be copolymerized with the other monomers. In the copolymer, the configuration of a structural unit originating in the compound (2) may be any of random, block and alternation. The compound (2) can be graft-polymerized with the other polymers.

EXAMPLES

The present invention shall be explained in details with reference to following examples, but the present invention shall not be restricted by these examples. In chemical formulas in the examples, Ph is phenyl; Me is methyl; i-Pr is isopropyl; i-Bu is isobutyl; and TMS is trimethylsilyl. An average molecular weight in the examples is a value which is measured by gel permeation chromatography (GPC) using tetrahydrofuran (THF) as an eluant and which is calculated from a calibration curve prepared using standard polystyrene, and it is not corrected. All NMR spectra were recorded on JEOL GSX-400 spectrometer. Deuterated chloroform was used as the solvent with tetramethylsilane as internal standard.

Example 1

<Production of Compound (1-1)>

A 1000-ml four-necked flask equipped with a reflux condenser, a thermometer and a dropping funnel was charged with phenyltrimethoxysilane (99 g), sodium hydroxide (10 g) and 2-propanol (500 ml). Deionized water (11 g) was added dropwise at a room temperature in about 2 minutes while stirring by means of a magnetic stirrer. Then, the solution was refluxed on an oil bath. Stirring was continued for 1.5 hour since refluxing started. Then the solution was cooled down at room temperature and left standing for 15 hours. Then product was precipitated. A stainless steel pressure filter equipped with a membrane filter having a pore diameter of 0.1 μm was used to separate the precipitate. Then, the precipitate thus obtained was washed once with 2-propanol and dried at 70° C. for 4 hours in a vacuum dryer to obtain 66 g of a white powder.

<Characterization of Compound (1-1)>

A 50-ml three-necked flask equipped with a dropping funnel, a reflux condenser and a thermometer was charged with the white powder (1.2 g) described above, THF (12 g) and triethylamine (1.8 g), and sealed under dry nitrogen. Chlorotrimethylsilane (2.3 g) was added dropwise form the dropping funnel at a room temperature in about one minute while stirring by means of a magnetic stirrer. After finishing dropwise addition, stirring was further continued at a room temperature for 3 hours. Then, deionized water (10 g) was added to dissolve by-produced sodium chloride and to hydrolyze unreacted chlorotrimethylsilane. The reaction mixture was separated by means of a separating funnel, and the organic layer was repeatedly washed with deionized water until the aqueous layer neutralized. This organic layer was dried over anhydrous magnesium sulfate (MgSO$_4$), filtered and evaporated to obtain 1.2 g of a white solid.

The white solid thus obtained was subjected to structural analysis by means of GPC, $^1$H-NMR, $^{29}$Si-NMR and infrared absorption spectroscopy. It was confirmed from the GPC chart that the white solid showed monodispersibility and that it had a weight-average molecular weight of 900 and a purity of 98% by weight. $^1$H-NMR was measured to result in confirming that a phenyl group and a trimethylsilyl group were present in an integral ratio of 7:3. $^{29}$Si-NMR was measured to result in confirming that three peaks indicating a T structure having a phenyl group were present in a ratio of 1:3:3 in −77.27 ppm, −77.60 ppm and −78.23 ppm and that one peak indicating a trimethylsilyl group was present in 11.66 ppm. The infrared absorption spectroscopy of the white solid obtained above was measured by a KBr tablet method. And it was confirmed that absorptions attributed respectively to deformation vibration of Si-Ph in 1430 and 1590 cm$^{-1}$, harmonic vibration of a substituted benzene ring in 1960 to 1760 cm$^{-1}$, stretching vibration of Si—O—Si in 1200 to 950 cm$^{-1}$ and vibration of Si—CH$_3$ in 1250 cm$^{-1}$, were present. A structure of Formula (a) was supported by these absorptions. Accordingly, it was judged that the compound before subjected to trimethylsilylation had a structure of Formula (1-1):

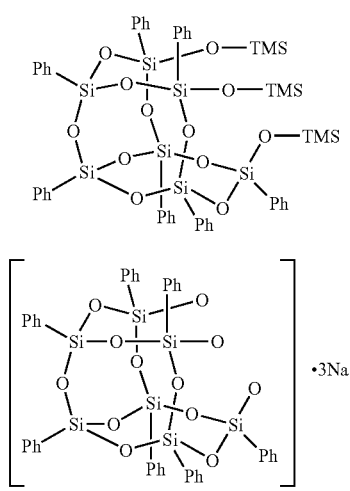

Example 2

<Production (1) of Hydrosilyl Group-containing Silsesquioxane Derivative>

A 3000-ml three-necked flask equipped with a dropping funnel, a thermometer and a stirrer was charged with the compound (1-1) (249 g) produced by refering the method in Example 1 and toluene (2000 ml) and sealed under dry nitrogen. Chlorodimethylsilane (142 g) was added dropwise in about 50 minutes while stirring so that the solution temperature was maintained at 20 to 40° C. After finishing dropwise addition, the flask was heated on an oil bath so that the solution temperature became 65° C., and stirring was continued for 3 hours after the temperature reached 65° C. Then the solution was cooled down became 50° C. or lower, and then deionized water (230 g) was added dropwise in about 10 minutes. After finishing dropwise addition, stirring was continued for 10 minutes, and then, the reaction mixture was separated by means of a separating funnel, and the organic layer was repeatedly washed with each 200 g of deionized water, and then moisture was removed by azeotropic distillation to carry out concentration under reduced pressure, whereby 242 g of a white solid was obtained.

The white solid thus obtained was subjected to infrared absorption spectroscopy by the KBr tablet method to confirm absorption based on Si—H stretching in 2134 cm$^{-1}$. $^1$H-NMR was measured to result in confirming a signal indicating a Si—H group in 4.98 ppm. $^{29}$Si-NMR was measured to result in confirming a signal of a dimethylsilyl group in −2.76 ppm. The average molecular weight was measured by GPC to result in finding that the number-average molecular weight was 850 and that the weight-average molecular weight was 860. The data described above indicates a structure represented by Formula (7):

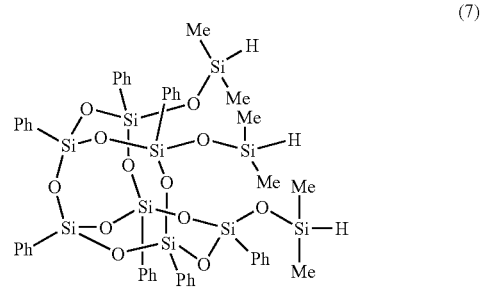

Example 3

<Production (2) of Hydrosilyl Group-containing Silsesquioxane Derivative>

A 50-ml two-necked flask equipped with a dropping funnel and a thermometer was charged with the compound (1-1) (1.0 g), THF (10 g) and triethylamine (0.9 g) and sealed under dry nitrogen. Chlorodiisopropylsilane (2.3 g) was added dropwise in about 10 seconds while stirring so that the solution temperature was maintained at 15 to 17° C., and then stirring was continued at 15° C. for 3 hours. Deionized water (10 g) was added dropwise to this reaction mixture in about one minute so that the solution temperature was maintained at 30° C. or lower. After finishing dropwise addition, stirring was continued for 10 minutes, and the reaction mixture was separated by means of a separating funnel, and the organic layer was washed three times with each 10 g of deionized water. This organic layer was dried over MgSO$_4$, filtered and evaporated to obtain 1.1 g of a white solid.

The white solid thus obtained was subjected to infrared absorption spectroscopy by the KBr tablet method to confirm absorption based on Si—H stretching in 2116 cm$^{-1}$. $^{29}$Si-NMR was measured to result in confirming a signal of a diisopropylsilyl group in 6.22 ppm. The average molecular weight was measured by GPC to result in finding that the number-average molecular weight was 970 and that the weight-average molecular weight was 1030. The data described above indicates a structure represented by Formula (8):

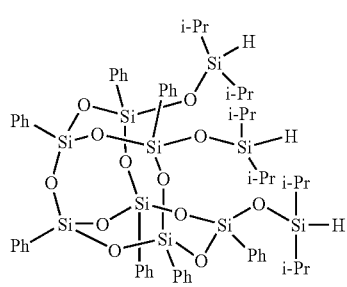

(8)

Example 4

<Production (3) of Hydrosilyl Group-containing Silsesquioxane Derivative>

Reaction was carried out by refering the method in Example 3 to obtain 1.0 g of a colorless, transparent viscous liquid, except that chloro-methyl-phenyl-silane (0.5 g) was substituted for chlorodiisopropylsilane. This viscous liquid was subjected to infrared absorption spectroscopy by a liquid membrane method to confirm absorptions of stretching vibration of a Si—OH group in 3605 cm$^{-1}$ and Si—H stretching vibration in 2145 cm$^{-1}$. $^{29}$Si-NMR was measured to result in confirming a signal of a methylphenylsilyl group in −10.64 ppm and −10.75 ppm and a signal of Si(OH) O$_{2/2}$ in −69.31 ppm. The average molecular weight was measured by GPC to result in finding that the number-average molecular weight was 880 and that the weight-average molecular weight was 890. The data described above indicates a structure represented by Formula (9):

(9)

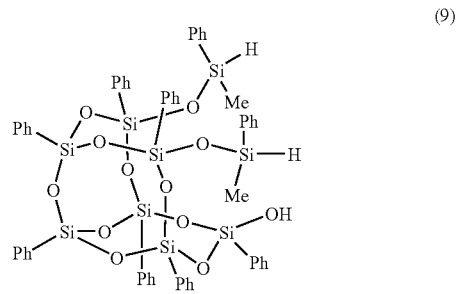

Example 5

<Production (1) of Glycidyl Group-containing Silsesquioxane Derivative>

A 200-ml three neck flask equipped with a thermometer, a dropping funnel and a reflux condenser was charged with the compound (7) (44.2 g) obtained in Example 2, allyl glycidyl ether (27.6 g) and toluene (72.0 g) and sealed under dry nitrogen. The flask was heated while stirring by means of a magnetic stirrer until the solution temperature reached 70° C., and then a Karstedt's catalyst (60 µl) was added thereto by means of a microsyringe. Stirring was continued for 3 hours, and then a part of the reaction mixture was sampled and subjected to infrared absorption spectroscopy to confirm that absorption of 2134 cm$^{-1}$ indicating a Si—H group disappeared, which was set as the end point of the reaction. The reaction mixture thus obtained was evaporated, and then methyl alcohol (176 g) and powder activated carbon (0.58 g) (manufactured by Wako Pure Chemical Industries Ltd.) were added to the residue, followed by continuing stirring at a room temperature for 2 hours. The powder activated carbon was removed by filtration, and then the solution was evaporated to obtain 56.5 g of a colorless, transparent solid.

The colorless, transparent solid thus obtained was measured for $^1$H-NMR to result in finding that a signal indicating a Si—H group disappeared and confirming a new signal corresponding to a glycidyl group. $^{29}$Si-NMR was measured to result in confirming a signal of a dimethylglycidoxypropylsilyl group in 3.81 ppm. The average molecular weight was measured by GPC to result in finding that the number-average molecular weight was 1110 and that the weight-average molecular weight was 1140. The data described above indicates that the colorless transparent solid obtained is the glycidyl group-containing silsesquioxane derivative represented by Formula (10):

(10)

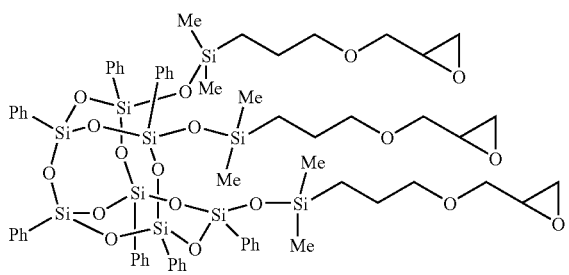

Example 6

<Production (1) of Hydroxyl Group-containing Silsesquioxane Derivative>

The same reacting apparatus as in Example 5 was used, and this was charged with the compound (7) (50.0 g), 2-allyloxy ethanol (27.7 g) and toluene (77.7 g) and sealed under dry nitrogen. The Karstedt's catalyst (14 µl) was added thereto at a room temperature by means of a microsyringe while stirring by means of a magnetic stirrer. Stirring was further continued for 3 hours, and then a part of the reaction mixture was sampled and subjected to infrared absorption spectroscopy to confirm that absorption of 2134 cm$^{-1}$ indicating a Si—H group disappeared, which was set as the end point of the reaction. The reaction mixture thus obtained was evaporated, and then the residue was dissolved in ethyl acetate and refined as example 5 to finally obtain 65.0 g of a colorless, transparent solid.

This colorless, transparent solid was subjected infrared absorption spectroscopy by the KBr tablet method to result in confirming absorption given by O—H stretching vibration of a hydroxyl group in 3450 cm$^{-1}$. $^1$H-NMR was measured to result in confirming a signal of an OH group in 2.7 ppm. The average molecular weight was measured by GPC to result in finding that the number-average molecular weight was 1250 and that the weight-average molecular weight was 1390. The data described above indicates that the colorless transparent solid obtained is the hydroxyl group-containing silsesquioxane derivative represented by Formula (11):

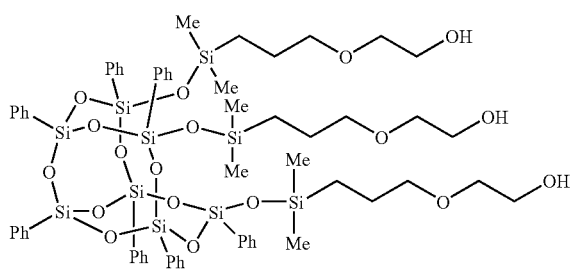

(11)

Example 7

<Synthesis of Alkyleneoxy Group-containing Silsesquioxane Derivative>

A 100-ml three necked flask equipped with a thermometer, a dropping funnel and a reflux condenser was charged with 3-2-(2-methoxyethoxy)-ethoxy)-propene (27.7 g) and toluene (26.0 g) and sealed under dry nitrogen. The flask was heated on an oil bath while stirring by means of a magnetic stirrer to set the solution temperature to 65° C. Then, the Karstedt's catalyst (26 μl) was added thereto by means of a microsyringe. Next, a mixed solution of the compound (7) (14.0 g) obtained in Example 2 and toluene (26.0 g) was added dropwise, and then stirring was continued for 2 hours. A part of the reaction mixture was sampled and subjected to infrared absorption spectroscopy to confirm that absorption of 2134 cm$^{-1}$ indicating a Si—H group disappeared, which was set as the end point of the reaction. Then, after-treatment was carried out by refering the method in Example 5 to obtain 17.0 g of a viscous liquid.

This viscous liquid was measured for $^1$H-NMR to result in confirming a signal of a —OCH$_3$ group in 3.3 ppm. The average molecular weight was measured by GPC to result in finding that the number-average molecular weight was 1290 and that the weight-average molecular weight was 1330. The data described above indicates that the viscous liquid obtained is the alkyleneoxy group-containing silsesquioxane derivative represented by Formula (12):

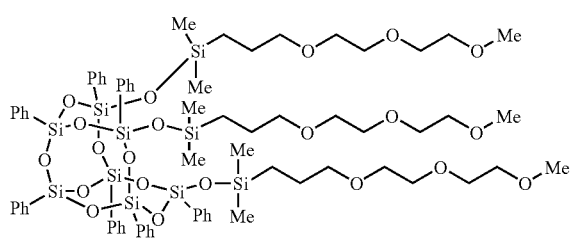

(12)

Example 8

<Production of Carboxyl Group-containing Silsesquioxane Derivative>

A 25-ml two-neck flask equipped with a thermometer, a dropping funnel and a reflux condenser was charged with the compound (7) (4.4 g), trimethylsilyl 4-pentenoate (2.3 g) and toluene (6.7 g) and sealed under dry nitrogen. The flask was heated on an oil bath while stirring by means of a magnetic stirrer until the solution temperature reached 70° C., and then the Karstedt's catalyst (3.9 μl) was added thereto by means of a microsyringe. Stirring was continued for one hour, and then a part of the reaction mixture was sampled and subjected to infrared absorption spectroscopy to result in confirming that absorption of 2134 cm$^{-1}$ indicating a Si—H group disappeared, which was set as the end point of the reaction. The reaction mixture was cooled down to a room temperature and then evaporated. Methyl alcohol (4.2 g) was added to the resulting residue, and then stirring was continued at a room temperature for 5 hours by means of a magnetic stirrer. This methyl alcohol solution was filtered and then concentrated under reduced pressure to obtain 5.1 g of a pale brown solid. The pale brown solid thus obtained was dissolved in THF (4.0 g) and then refined by reprecipitation with normal heptane (150 g) to finally obtain 3.6 g of a white solid.

This white solid was measured for $^1$H-NMR to result in finding that a signal indicating a Si—H group disappeared and confirming a new broad signal of 10.46 ppm corresponding to a carboxyl group. $^{13}$C-NMR was measured to result in confirming a signal of 180.40 ppm corresponding to a carboxyl group and further confirming that a signal of −0.43 ppm indicating a trimethylsilyl group completely disappeared. The average molecular weight was measured by GPC to result in finding that the number-average molecular weight was 1260 and that the weight-average molecular weight was 1300. The data described above indicates that the white solid matter obtained is the carboxyl group-containing silsesquioxane derivative represented by Formula (13):

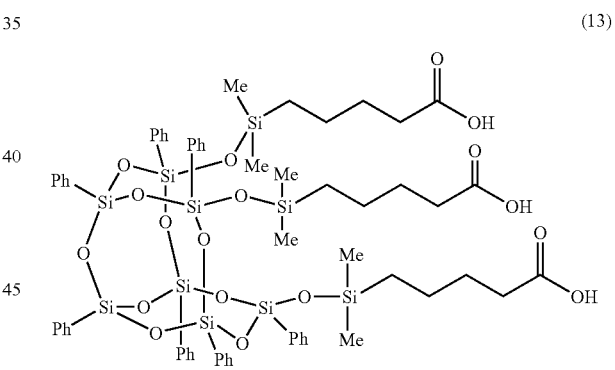

(13)

Example 9

<Production of 2-oxapropanedioyl Group-containing Silsesquioxane Derivative>

The same reacting apparatus as in Example 7 was used, and this was charged with the compound (7) (4.4 g), allylsuccinic anhydride (2.3 g) and toluene (6.7 g), and sealed under dry nitrogen. The flask was heated on an oil bath while stirring by means of a magnetic stirrer until the solution temperature reached 80° C., and then the Karstedt's catalyst (3.9 μl) was added thereto by means of a microsyringe. Stirring was continued for one hour, and then a part of the reaction mixture was sampled and subjected to infrared absorption spectroscopy to confirm that absorption of 2134 cm$^{-1}$ indicating a Si—H group disappeared, which was set as the end point of the reaction. Next, the reaction mixture was cooled down to a room temperature and then concentrated under reduced pressure by means of a rotary evaporator. Methyl alcohol (4.2 g) was added to the resulting residue, and stirring was continued for 15 hours by means of the magnetic stirrer. Then, the solution was filtered and evaporated to thereby obtain 5.1 g of a pale brown solid.

This pale brown solid was measured for $^{13}$C-NMR to result in confirming signals corresponding to a substituted succinic anhydride group in 170.44 ppm and 174.04 ppm. The average molecular weight was measured by GPC to result in finding that the number-average molecular weight was 1350 and that the weight-average molecular weight was 1430. The data described above indicates that the pale brown solid obtained is the 2-oxapropanedioyl group-containing silsesquioxane derivative represented by Formula (14):

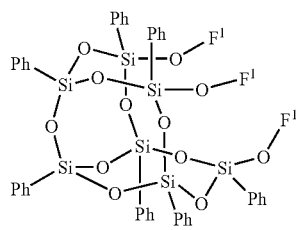

(14)

In Formula (14), $F^1$ is the following group:

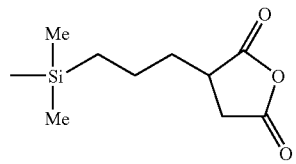

Example 10

<Production of Methacryloyloxy Group-containing Silsesquioxane Derivative>

A 2000-ml three-necked flask equipped with a dropping funnel, a stirrer and a thermometer was charged with the compound (1-1) (60 g) synthesized by refering the method in Example 1, THF (1200 ml) and triethylamine (24 g) and sealed under dry nitrogen. 2-Methyl-acrylic acid 3-(chlorodimethylsilanyl)-propyl ester (52.8 g) was added dropwise in about 10 seconds while stirring by means of a magnetic stirrer so that the solution temperature was maintained at 20 to 25° C. After finishing dropwise addition, stirring was continued for 3.5 hours, and then a saturated solution of salt (200 g) was slowly added dropwise so that the solution temperature was maintained at 25° C. or lower. Toluene (3000 ml) was added thereto and stirred, and then the reaction mixture was separated by means of a separating funnel, and the organic layer was repeatedly washed with deionized water until the aqueous layer neutralized. This organic layer was dried over MgSO$_4$, filtered and evaporated to obtain 99 g of a white solid. The white solid thus obtained was recrystallized from methyl alcohol (800 g) to finally obtain 62 g of a white solid.

The white solid thus obtained was subjected to infrared absorption spectroscopy by the KBr tablet method to confirm absorption based on C=O stretching in 1719 cm$^{-1}$. $^{29}$Si-NMR was measured to result in confirming a signal of a dimethylmethacryloxypropylsilyl group in 11.50 ppm. The average molecular weight was measured by GPC to result in finding that the number-average molecular weight was 1210 and that the weight-average molecular weight was 1220. The data described above indicates that the white solid obtained is the methacryloyloxy group-containing silsesquioxane derivative represented by Formula (15):

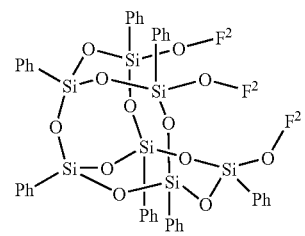

(15)

In Formula (15), $F^2$ is the following group:

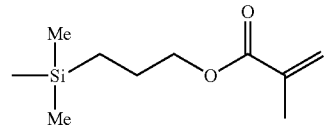

Example 11

<Production of 3,3,3-trifluoropropyl Group-containing Silsesquioxane Derivative>

A reactor having an inner volume of 50 ml equipped with a dropping funnel and a thermometer was charged with the compound (1-1) (2.0 g), THF (20.0 g) and triethylamine (1.8 g) and sealed under dry nitrogen. Chloro-dimethyl-(3,3,3-trifluoropropyl)-silane (5.0 g) was added dropwise in about one minute while stirring so that the solution temperature was maintained at 20 to 30° C., and then stirring was further continued for 2.5 hours. Deionized water (10 g) was slowly added dropwise, and then the reaction mixture was separated by means of a separating funnel, and the organic layer was repeatedly washed with deionized water until the aqueous layer neutralized.

This organic layer was dried over MgSO$_4$, filtered and evaporated to obtain 2.3 g of a white solid.

The white solid thus obtained was subjected to infrared absorption spectroscopy by the KBr tablet method to confirm absorption based on C-F stretching in 1210 cm$^{-1}$. $^{13}$C-NMR was measured to result in confirming four split signals of a CF$_3$ group in 128.0 ppm (J$_{CF}$=276 Hz) $^{29}$Si-NMR was measured to result in confirming a signal of a dimethyl-3,3,3-trifluoropropylsilyl group in 11.03 ppm. The average molecular weight was measured by GPC to result in finding that the number-average molecular weight was 1220 and that the weight-average molecular weight was 1380. The data described above indicates that the white solid obtained is the 3,3,3-trifluoropropyl group-containing silsesquioxane derivative represented by Formula (16):

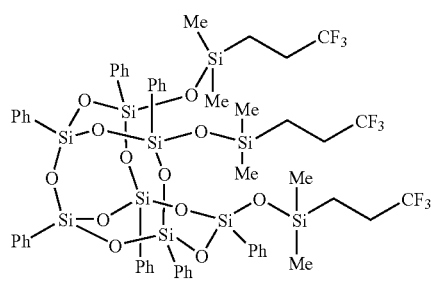

Example 12

<Production of 3-chloropropyl Group-containing Silsesquioxane Derivative>

A reactor having an inner volume of 100 ml equipped with a dropping funnel a thermometer was charged with the compound (1-1) (5.0 g), THF (50.0 g) and triethylamine (2.5 g) and sealed under dry nitrogen. Chloro-(3-chloropropyl)-dimethyl-silane (7.7 g) was added dropwise in about 2 minutes while stirring so that the solution temperature was maintained at 25 to 40° C., and then stirring was further continued for 2.5 hours. Deionized water (30 g) was slowly added dropwise, and then the reaction mixture was separated by means of a separating funnel, and the organic layer was repeatedly washed with deionized water until the aqueous layer neutralized. This organic layer was dried over MgSO$_4$, filtered and evaporated. The residue obtained was recrystallized from methyl alcohol to obtain 4.5 g of a white solid.

The white solid thus obtained was subjected to infrared absorption spectroscopy by the KBr tablet method to confirm absorption based on C—Cl stretching in 793 cm$^{-1}$. $^1$H-NMR was measured to result in confirming three split signals of a —CH$_2$Cl group in 3.5 ppm. $^{29}$Si-NMR was measured to result in confirming a signal of a 3-chloropyldimethylsilyl group in 11.52 ppm. The average molecular weight was measured by GPC to result in finding that the number-average molecular weight was 930 and that the weight-average molecular weight was 970. The data described above indicates that the white solid is the 3-chloropropyl group-containing silsesquioxane derivative represented by Formula (17):

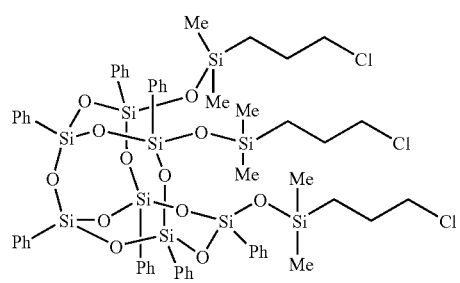

Example 13

<Production of Compound (1-2)>

A 1000-ml four-necked flask equipped with a reflux condenser, a thermometer and a dropping funnel was charged with trimethoxy-3,3,3-trifluoropropylsilane (100 g), THF (500 ml), deionized water (10.5 g) and sodium hydroxide (7.9 g), and the solution was refluxed on an oil bath while stirring by means of a magnetic stirrer. Stirring was continued for 5 hours since refluxing started. Then, the solution was cooled down at room temperature and left standing for 15 ours, and then it was set again on the oil bath to carry out heating and concentrating under atmospheric pressure until a solid was deposited. The deposited product was separated by means of a stainless steel pressure filter equipped with a membrane filter having a pore diameter of 0.5 μm. Then, the solid thus obtained was washed once with THF and dried at 80° C. for 3 hours in a vacuum dryer to obtain 74 g of a white powder solid.

<Characterization of Compound (1-2)>

A 50-ml four-necked flask equipped with a dropping funnel, a reflux condenser and a thermometer was charged with the white powder solid (1.0 g) obtained in Example 13, THF (10 g) and triethylamine (1.0 g) and sealed under dry nitrogen. Chlorotrimethylsilane (3.3 g) was added dropwise at a room temperature in about one minute while stirring by means of a magnetic stirrer. After finishing dropwise addition, stirring was further continued at a room temperature for 3 hours. Then, the same treatment as in the confirmation of the structure of the compound (1-1) in Example 1 was carried out to obtain 0.9 g of a white powder solid.

The white powder solid thus obtained was subjected to structural analysis by means of GPC, $^1$H-NMR, $^{29}$Si-NMR and $^{13}$C-NMR. GPC measurement was carried out to confirm that the white powder solid showed monodispersibility and that it had a weight-average molecular weight of 1570 and a purity of 98% by weight. $^1$H-NMR was measured to result in confirming that a 3,3,3-trifluoropropyl group and a trimethylsilyl group were present in an integral ratio of 7:3. $^{29}$Si-NMR was measured to result in confirming that three peaks indicating a T structure having a 3,3,3-trifluoropropyl group were present in a ratio of 1:3:3 and that one peak indicating a trimethylsilyl group was present in 12.11 ppm. $^{13}$C-NMR was measured to result in confirming that peaks indicating a 3,3,3-trifluoropropyl group were present in 131 to 123 ppm, 28 to 27 ppm and 6 to 5 ppm and that a peak indicating a trimethylsilyl group was present in 1.4 ppm. Accordingly, it is judged that the compound before subjected to trimethylsilylation has a structure of Formula (1-2):

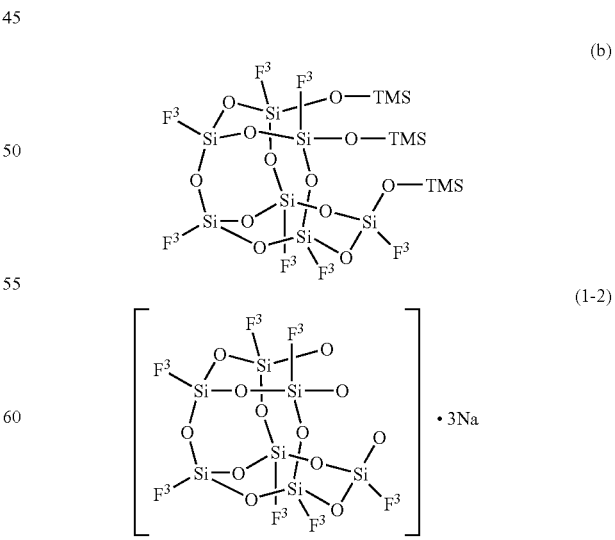

In these Formulas, F$^3$ is —CH$_2$CH$_2$CF$_3$.

Example 14

<Production (4) of Hydrosilyl Group-containing Silsesquioxane Derivative>

A 300-ml three-necked flask equipped with a dropping funnel, a thermometer and a stirrer was charged with the compound (1-2) (10 g) produced by refering the method in Example 13 and a hydrochlorofluorocarbon base mixed solvent (80 ml), and sealed under dry nitrogen. Chlorodimethylsilane (12.5 g) was added dropwise in about 5 minutes while stirring at a room temperature. After finishing dropwise addition, the flask was heated on an oil bath so that the solution temperature became 50° C., and stirring was continued for 5 hours. The flask was cooled until the solution temperature became 30° C. or lower, and then Deionized water (60 g) was added dropwise in about 5 minutes. After finishing dropwise addition, stirring was continued for 10 minutes, and then the reaction mixture was separated by means of a separating funnel, and the organic layer was washed three times with each 10 g of deionized water until the aqueous layer neutralized. This organic layer was dried over MgSO$_4$, filtered, and evaporated to obtain 8.8 g of a white powder solid.

The white powder solid thus obtained was subjected to infrared absorption spectroscopy by the KBr tablet method to confirm absorption based on Si—H stretching in 2140 cm$^{-1}$. $^{29}$Si-NMR was measured to result in confirming a signal of a dimethylsilyl group in -2.38 ppm. The average molecular weight was measured by GPC to result in finding that the number-average molecular weight was 1430 and that the weight-average molecular weight was 1440. These data indicates a structure represented by Formula (18):

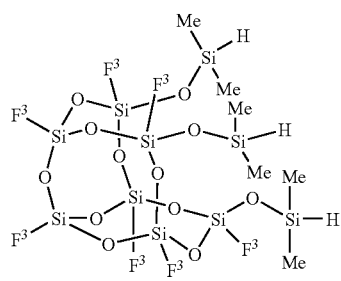

(18)

In Formula (18), F$^3$ is —CH$_2$CH$_2$CF$_3$.

Example 15

<Production (2) of Glycidyl Group-containing Silsesquioxane Derivative>

A 50-ml three-necked flask equipped with a thermometer, a dropping funnel and a reflux condenser was charged with the compound (18) (1.0 g) obtained in Example 14, allyl glycidyl ether (0.6 g) and toluene (3.6 g), and sealed under dry nitrogen. The flask was heated on an oil bath while stirring by means of a magnetic stirrer until the solution temperature reached 67° C., and then the Karstedt's catalyst (9.0 μl) was added thereto by means of a microsyringe.

Further, stirring was continued for 2 hours, and then a part of the reaction mixture was sampled and subjected to infrared absorption spectroscopy to confirm that absorption of 2140 cm$^{-1}$ originating in a Si—H group disappeared, which was set as the end point of the reaction. The reaction mixture thus obtained was evaporated to obtain 1.0 g of a colorless, transparent and viscous liquid.

The colorless, transparent and viscous liquid thus obtained was measured for $^1$H-NMR to result in finding that a signal indicating a Si—H group disappeared and confirming a new signal corresponding to a glycidyl group. $^{29}$Si-NMR was measured to result in confirming a signal of a dimethylglycidoxypropylsilyl group in 12.37 ppm. The average molecular weight was measured by GPC to result in finding that the number-average molecular weight was 1700 and that the weight-average molecular weight was 2050. The data described above indicates that the colorless, transparent and viscous matter obtained is the glycidyl group-containing silsesquioxane derivative represented by Formula (19):

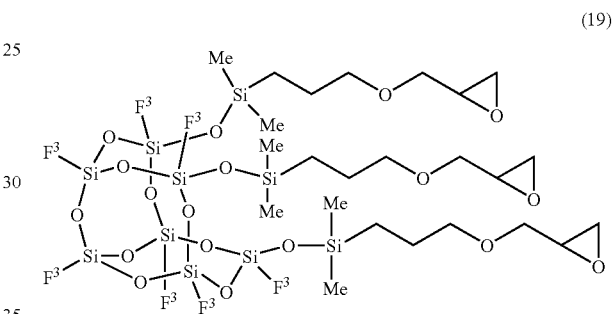

(19)

In Formula (19), F$^3$ is —CH$_2$CH$_2$CF$_3$.

Example 16

<Production (2) of Hydroxyl Group-containing Silsesquioxane Derivative>

The same reacting apparatus as in Example 15 was used, and this was charged with the compound (18) (2.5 g) obtained in Example 14, 2-allyloxy ethanol (2.7 g) and toluene (3.0 g) and sealed under dry nitrogen. The Karstedt's catalyst (17 μl) was added thereto at a room temperature by means of a microsyringe while stirring by means of a magnetic stirrer. Further, stirring was continued for 2 hours, and then a part of the reaction mixture was sampled and subjected to infrared absorption spectroscopy to confirm that absorption of 2140 cm$^{-1}$ originating in a Si—H group disappeared, which was set as the end point of the reaction. The reaction mixture was evaporated to obtain 2.6 g of a brown viscous liquid.

This brown viscous liquid was subjected to infrared absorption spectroscopy by a liquid membrane method to result in confirming absorption given by O-H stretching vibration of a hydroxyl group in 3450 cm$^{-1}$. $^1$H-NMR was measured to result in confirming a signal of an OH group in 2.7 ppm. The average molecular weight was measured by GPC to result in finding that the number-average molecular weight was 1790 and that the weight-average molecular weight was 1910. The data described above indicates that the brown viscous liquid obtained is the hydroxyl group-containing silsesquioxane derivative represented by Formula (20):

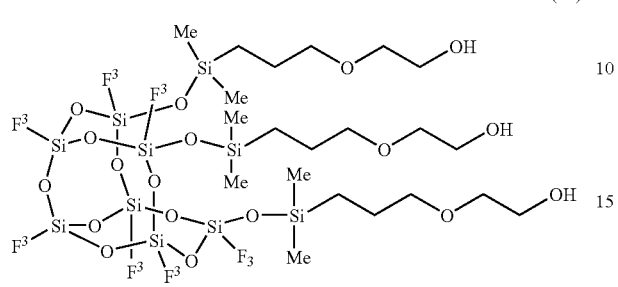

(20)

In Formula (20), $F^3$ is —$CH_2CH_2CF_3$.

Example 17

<Production (1) of Compound (1-3)>

A 200-ml four-necked flask equipped with a reflux condenser, a thermometer and a dropping funnel, was charged with cyclopentyltrimethoxysilane (19.0 g), THF (100 ml), sodium hydroxide (1.7 g) and deionized water (2.3 g), and it was heated on an oil bath while stirring by means of a magnetic stirrer. Stirring was continued for 10 hours since refluxing started (at this moment, the temperature of the reaction mixture was 67° C.) to complete the reaction. Then, the solution was cooled down at room temperature and left standing for 15 ours. Then product was precipitated. The precipitate was separated by filtration and dried under vacuum to obtain 4.2 g of a powder solid.

<Characterization of Compound (1-3)>

A 100-ml four-necked flask equipped with a reflux condenser was charged with the powder solid (1.0 g) obtained in Example 17, THF (30 ml), triethylamine (0.5 g) and chlorotrimethylsilane (0.7 g), and stirred at a room temperature for 2 hours while stirring by means of a magnetic stirrer. After finishing the reaction, the same treatment as in the confirmation of the structure of Compound (1-1) in Example 1 was carried out to obtain 0.9 g of a powder solid.

The powder solid thus obtained was subjected to structural analysis by means of $^1$H-NMR, $^{29}$Si-NMR and X-ray crystalline structure analysis. $^1$H-NMR was measured to result in confirming that a cyclopentyl group and a trimethylsilyl group were present in an integral ratio of 7:3. $^{29}$Si-NMR was measured to result in confirming a peak of 8.43 ppm indicating a trimethylsilyl group and three peaks of −66.37 ppm, −67.97 ppm and −67.99 indicating a cyclopentyl group. A ratio of the sum of the signal strengths in −67.97 ppm and −67.99 to the signal strengths in −66.37 ppm was 6:1. It was confirmed from these results and the structure obtained by the X-ray crystallography that the powder solid which was a target for the analysis was a silicon compound represented by Formula (c). Accordingly, it was indicated that the compound obtained in Example 17 had a structure shown by Formula (1-3):

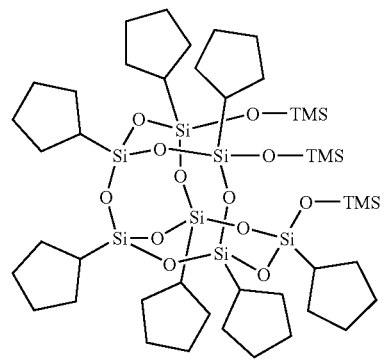

(c)

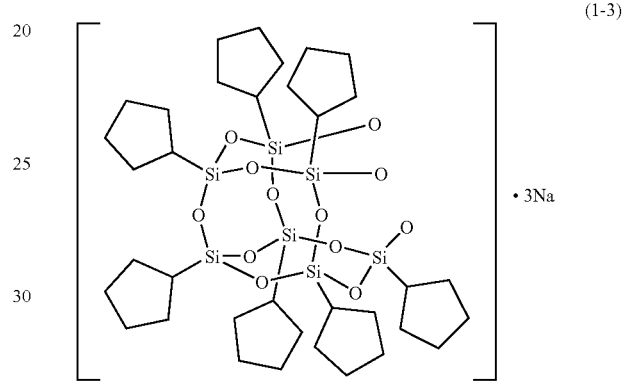

(1-3)

Example 18

<Production (2) of Compound (1-3)>

A 100-ml four-necked flask equipped with a reflux condenser, a thermometer and a dropping funnel was charged with toluene (10.0 g) and deionized water (5.0 g). Then, a mixed solution of cyclopentyl-trimethoxy-silane (10.0 g) and toluene (10.0 g) was added dropwise thereto in 30 minutes while stirring by means of a magnetic stirrer, and stirring was further continued at a room temperature for 2 hours. Then, a 5.0 weight % aqueous solution (1.0 ml) of sodium hydroxide was added thereto and heated up to a refluxing temperature, and stirring was further continued for 2 hours to complete the reaction. The solution was cooled down to a room temperature and then washed with deionized water, and it was heated and distilled under reduced pressure to obtain a residue (5.1 g). The residue thus obtained was measured for an average molecular weight by means of GPC to find that the weight-average molecular weight was 1190. A 200 ml four-necked flask equipped with a reflux condenser and a thermometer was charged with the residue (2.8 g) obtained in Example 18, THF (50 ml) and sodium hydroxide (0.4 g), and the solution was refluxed by heating on an oil bath (at this moment, the temperature of the solution was 67° C.) while stirring by means of a magnetic stirrer. Stirring was continued for 17 hours since refluxing started. Then, the solution was cooled to room temperature and left standing for 15 ours. Then product was precipitated. The precipitate was separated by filtration and dried under vacuum to obtain 0.3 g of a powder solid. This powder solid was subjected to structural analysis to result in estimating that this compound had the structure shown by Formula (1-3) as with the compound obtained in Example 17.

Example 19

<Production (3) of Compound (1-3)>

A 100-ml four-necked flask equipped with a reflux condenser, a thermometer and a dropping funnel was charged with cyclopentyl-trimethoxy-silane (5.0 g), 2-propanol (30 ml), sodium hydroxide (0.7 g) and deionized water (0.6 g), and it was heated on an oil bath while stirring by means of a magnetic stirrer. Stirring was continued for 5 hours since refluxing started (in this case, the solution temperature was 77° C.). Then, the solvent was removed under heating at 80° C. by means of an evaporator to obtain 3.6 g of a powder solid. This powder solid was subjected to structural analysis to result in estimating that this compound had the structure shown by Formula (1-3) as with the compound obtained in Example 17.

Example 20

<Production of Compound (1-4)>

A 200-ml four-necked flask equipped with a reflux condenser, a thermometer and a dropping funnel was charged with isobutyltrimethoxysilane (18.7 g), THF (100 ml), sodium hydroxide (1.8 g) and deionized water (2.4 g), and it was heated on an oil bath while stirring by means of a magnetic stirrer. Stirring was continued for 10 hours since refluxing started (at this moment, the solution temperature was 67° C.). The reaction mixture was concentrated under atmospheric pressure until a solid was deposited, and then the resulting concentrate was left standing still at a room temperature for a night to completely deposit a solid. This was separated by filtration and dried under vacuum to obtain 5.1 g of a powder solid.

<Characterization of Compound (1-4)>

A 100 ml round bottle flask equipped with a reflux condenser was charged with the powder solid matter (1.0 g) obtained in Example 20, THF (20 ml), triethylamine (0.5 g) and chlorotrimethylsilane (0.8 g), and stirring was continued at a room temperature for 2 hours while stirring by means of a magnetic stirrer. Then, the same treatment as in the confirmation of the structure of Compound (1-1) in Example 1 was carried out to obtain 0.9 g of a powder solid.

The powder solid described above was subjected to structural analysis by means of $^1$H-NMR and $^{29}$Si-NMR. $^1$H-NMR was measured to result in confirming that an isobutyl group and a trimethylsilyl group were present in an integral ratio of 7:3. $^{29}$Si-NMR was measured to result in confirming that a signal of 8.72 ppm indicating a trimethylsilyl group was present and that three kinds of signals of −67.38 ppm, −68.01 ppm and −68.37 indicating a T structure having an isobutyl group were present in a ratio of 1:3:3. It was confirmed from these results that the powder solid, which was a target for the analysis, was a compound represented by Formula (d). Accordingly, it was indicated that the compound obtained in Example 20 had a structure represented by Formula (1-4):

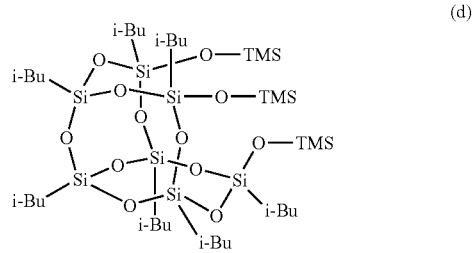

(d)

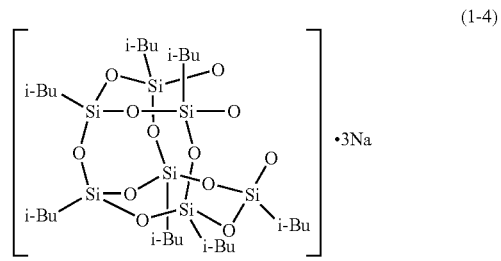

(1-4)

Example 21

<Production of Compound (1-5)>

A 50-ml four-necked flask equipped with a reflux condenser, a thermometer and a dropping funnel was charged with tridecafluoro-1,1,2,2,-tetrahydrooctyl-triethoxysilane (4.9 g), THF (15 ml), sodium hydroxide (0.2 g) and deionized water (0.2 g), and it was heated on an oil bath while stirring by means of a magnetic stirrer. Stirring was continued for 5 hours since refluxing started (at this moment, the solution temperature was 75° C.). Then, it was cooled at room temperature and left standing for 15 ours, and then it was set again on the oil bath and concentrated by heating under atmospheric pressure until a solid was deposited. The deposited product was separated by means of a stainless steel pressure filter equipped with a membrane filter having a pore diameter of 0.5 μm, and then the product was washed once with THF and dried at 80° C. for 3 hours in a vacuum dryer to obtain 4.0 g of viscous liquid.

<Characterization of Compound (1-5)>

A 50-ml round bottle flask was charged with the viscous liquid (2.6 g) described above, THF (10 g), triethylamine (1.0 g) and chlorotrimethylsilane (3.3 g), and stirring was continued at a room temperature for 3 hours while stirring by means of a magnetic stirrer. Then, the same treatment as in the confirmation of the structure of Compound (1-1) in Example 1 was carried out to obtain 1.3 g of viscous liquid.

The viscous liquid thus obtained was measured by GPC to result in confirming that the solid was monodispersed and that it had a weight-average molecular weight of 3650 and a purity of 100% by weight. Synthetically judging this result and the results obtained in Examples 1, 13, 17 and 20, it was estimated that the viscous liquid, which was a target for the analysis, was a compound represented by Formula (e). Accordingly, it was indicated that the compound obtained in Example 21 had a structure represented by Formula (1-5):

(e)

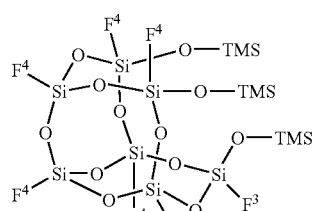

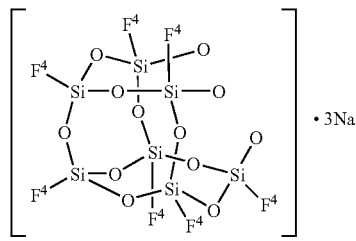

In these formulas, $F^4$ is —$CH_2CH_2(CF_2)_5CF_3$.

What is claimed is:

1. A compound represented by Formula (1-2):

(1-2)

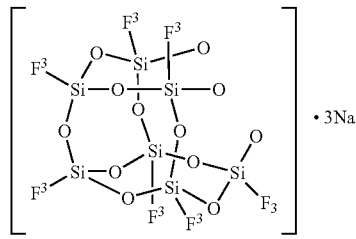

wherein $F^3$ is —$CH_2CH_2CF_3$.

2. A compound represented by Formula (18):

(18)

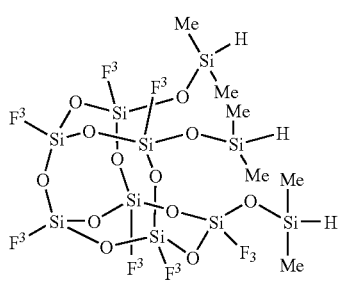

wherein $F^3$ is —$CH_2CH_2CF_3$, and Me is methyl.

3. A compound represented by Formula (19):

(19)

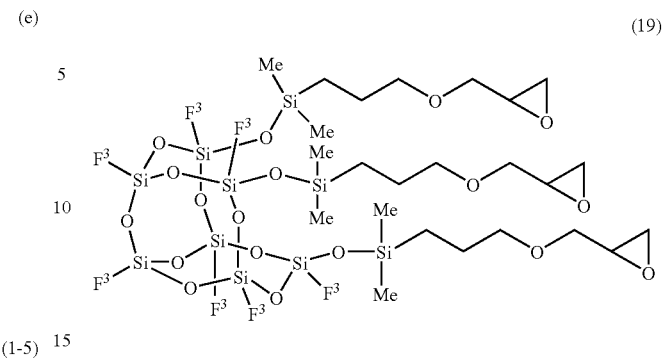

wherein $F^3$ is —$CH_2CH_2CF_3$, and Me is methyl.

4. A compound represented by Formula (20):

(20)

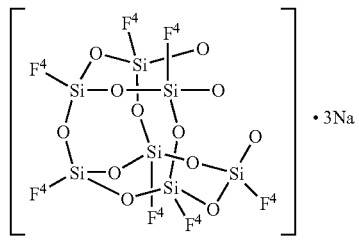

wherein $F^3$ is —$CH_2CH_2CF_3$, and Me is methyl.

5. A compound represented by Formula (1-5):

(1-5)

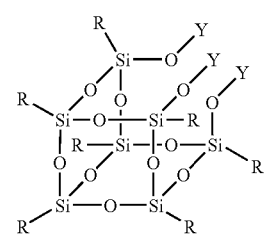

wherein $F^4$ is —$CH_2CH_2(CF_2)_5CF_3$.

6. A silsesquioxane derivative represented by Formula (2):

(2)

wherein R is 3,3,3-trifluoropropyl or tridecafluoro-1,1,2,2-tetrahydrooctyl; each Y is a group selected independently from groups represented by Formula (3) and hydrogen; and at least one of Y is a group selected from the groups represented by Formula (3):

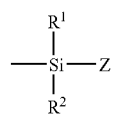 (3)

wherein $R^1$ and $R^2$ represent independently methyl, isopropyl, tert-butyl or phenyl; Z is hydrogen, alkenyl, or a group having any of —OH, alkenyl, cycloalkenyl, —COOH, —COO—, —OCO—, 2-oxapropanedioyl, polyalkyleneoxy, acryloyloxy, methacryloyloxy, oxiranyl,3,4-epoxycyclohexyl, oxetanyl, oxetanylene, —NH$_2$, —CN and —SH; provided that Z is not any of a group having a dithiocarbamate group, a group having haloalkylphenyl and a group having an α-haloester group.

* * * * *